US012812482B2

(12) United States Patent
Eklöf et al.

(10) Patent No.: US 12,812,482 B2
(45) Date of Patent: Nov. 24, 2026

(54) HANDLING OF REJECTION OF CANDIDATE TARGET CELLS FOR CONDITIONAL PSCELL CHANGE

(71) Applicant: Telefonaktiebolaget LM Ericsson (publ), Stockholm (SE)

(72) Inventors: Cecilia Eklöf, Täby (SE); Julien Muller, Rennes (FR); Icaro Leonardo Da Silva, Solna (SE); Jens Bergqvist, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 358 days.

(21) Appl. No.: 18/290,070

(22) PCT Filed: May 10, 2022

(86) PCT No.: PCT/IB2022/054334
§ 371 (c)(1),
(2) Date: Nov. 9, 2023

(87) PCT Pub. No.: WO2022/238896
PCT Pub. Date: Nov. 17, 2022

(65) Prior Publication Data
US 2024/0276320 A1 Aug. 15, 2024

Related U.S. Application Data

(60) Provisional application No. 63/186,710, filed on May 10, 2021.

(51) Int. Cl.
*H04W 36/00* (2009.01)

(52) U.S. Cl.
CPC . *H04W 36/0069* (2018.08); *H04W 36/00698* (2023.05); *H04W 36/0079* (2018.08)

(58) Field of Classification Search
None
See application file for complete search history.

(56) References Cited

U.S. PATENT DOCUMENTS

2020/0008113 A1* 1/2020 Chen ................. H04W 36/0085
2020/0351968 A1* 11/2020 Yilmaz ................. H04W 76/27
(Continued)

OTHER PUBLICATIONS

International Search Report and Written Opinion of the International Searching Authority, PCT/IB2022/054334, mailed Aug. 19, 2022, 21 pages.
(Continued)

*Primary Examiner* — Kodzovi Acolatse
(74) *Attorney, Agent, or Firm* — Sage Patent Group

(57) ABSTRACT

A method performed by a first network node operating as a Master Node (MN) for a user equipment (UE) configured with Multi-Radio Dual Connectivity, includes receiving a first request for conditional PSCell change (CPC) for the UE from a source secondary node (S-SN), the first request indicating a plurality of candidate cells for PSCell configuration, and transmitting a second request for CPC to a candidate target secondary node (T-SN), the second request indicating one or more candidate cells of the plurality of candidate cells for PSCell configuration that are served by the T-SN. The method further includes receiving a response from the T-SN indicating that a subset of the identified candidate cells were accepted by the T-SN and/or identifying a new candidate cell for CPC for the UE, and determining whether or not to configure the UE with CPC based on the response from the T-SN.

19 Claims, 18 Drawing Sheets

(56) References Cited

U.S. PATENT DOCUMENTS

| | | | | |
|---|---|---|---|---|
| 2021/0105681 | A1* | 4/2021 | Paladugu | H04W 36/00837 |
| 2021/0321310 | A1* | 10/2021 | Latheef | H04W 36/0077 |
| 2022/0086704 | A1* | 3/2022 | Futaki | H04W 36/00698 |
| 2022/0116810 | A1* | 4/2022 | Rugeland | H04W 28/0278 |
| 2022/0191968 | A1* | 6/2022 | Tsuboi | H04W 56/001 |
| 2022/0201573 | A1* | 6/2022 | Tsuboi | H04W 76/15 |
| 2022/0201574 | A1* | 6/2022 | Tsuboi | H04W 76/19 |
| 2022/0232448 | A1* | 7/2022 | Ebrahim Rezagah | H04W 36/00698 |
| 2022/0264414 | A1* | 8/2022 | Hu | H04W 36/00837 |
| 2022/0279586 | A1* | 9/2022 | Tsuboi | H04W 36/1443 |
| 2022/0345962 | A1* | 10/2022 | Hori | H04W 36/144 |
| 2022/0377629 | A1* | 11/2022 | Rugeland | H04W 36/0094 |
| 2022/0386191 | A1* | 12/2022 | Wu | H04W 36/362 |
| 2022/0400417 | A1* | 12/2022 | Zhang | H04W 24/08 |
| 2023/0047744 | A1* | 2/2023 | Wu | H04W 36/00837 |
| 2025/0380203 | A1* | 12/2025 | Eklöf | H04W 36/385 |

OTHER PUBLICATIONS

Catt, "Summary of [Post113e][234][eDCCA] CPAC procedures (CATT)," 3GPP TSG-RAN WG2 Meeting #113bis Electronic, R2-2103109, Online, Apr. 12-20, 2021, 43 pages.

Futurewei, "Discussion on the issues with SN initiated CPC," 3GPP TSG-RAN WG2 Meeting #113 bie-e, R2-2103155, E-Conference, Apr. 12-20, 2021, 5 pages.

3GPP TS 37.340 V16.5.0 (Mar. 2021); 3rd Generation Partnership Project; Technical Specification Group Radio Access Network; Evolved Terrestrial Radio Access (E-UTRA) and NR; Multi-connectivity; Stage 2 (Release 16); 84 pages.

Ericsson, "Network procedures and signalling for CPAC," 3GPP TSG-RAN WG2 #115e, R2-2108112, Electronic Meeting, Aug. 16-27, 2021, 14 pages.

Ericsson, "Conditional PSCell Addition Change," 3GPP TSG-RAN WG2 #114e, R2-2105897, Electronic Meeting, May 19-27, 2021, 14 pages.

3GPP TS 38.423 V16.5.0 (Apr. 2021); 3rd Generation Partnership Project; Technical Specification Group Radio Access Network; NG-RAN; Xn application protocol (XnAP) (Release 16), 461 pages.

3GPP TS 38.331 V16.4.1 (Mar. 2021); 3rd Generation Partnership Project; Technical Specification Group Radio Access Network; NR; Radio Resource Control (RRC) protocol specification (Release 16), 949 pages.

* cited by examiner

HANDLING OF REJECTION OF CANDIDATE TARGET CELLS FOR CONDITIONAL PSCELL CHANGE

CROSS REFERENCE TO RELATED APPLICATIONS

This application is a 35 U.S.C. § 371 national stage application of PCT International Application No. PCT/IB2022/054334 filed on May 10, 2022, which in turn claims the benefit of and priority to U.S. Provisional Application No. 63/186,710 filed on May 10, 2021, entitled "HANDLING OF REJECTION OF CANDIDATE TARGET CELLS FOR CONDITIONAL PSCELL CHANGE," the disclosure and content of which are incorporated by reference herein in their entirety.

BACKGROUND

The present disclosure relates to wireless communication networks, and in particular, to wireless communications networks that support dual connectivity (DC).

In 3GPP Rel-12, the Dual Connectivity (DC) feature was introduced to LTE to enable the UE to be connected in two cell groups, each controlled by an LTE access node, eNB, designated as the Master eNB, MeNB and the Secondary eNB, SeNB. The UE still only has one RRC connection with the network. In 3GPP, the Dual Connectivity (DC) solution has been evolved and is now also specified for NR as well as between LTE and NR. The term "multi-connectivity (MC)" is used when there are more than 2 nodes involved.

With introduction of 5G, the term MR-DC (Multi-Radio Dual Connectivity) was defined as a generic term for all dual connectivity options that include at least one NR access node. Using the MR-DC generalized terminology, the UE is connected in a Master Cell Group (MCG), controlled by the Master Node (MN), and in a Secondary Cell Group (SCG) controlled by a Secondary Node (SN).

Further, in MR-DC, when dual connectivity is configured for the UE, within each of the two cell groups, MCG and SCG, carrier aggregation may be used as well. In this case, within the MCG controlled by the MN, the UE may use one PCell and one or more SCell(s). And within the Secondary Cell Group, SCG, controlled by the SN, the UE may use one Primary SCell (PSCell, also known as the primary SCG cell in NR) and one or more SCell(s). This combined case is illustrated in FIG. 1, which is an illustration of dual connectivity combined with carrier aggregation in MR-DC. In NR, the primary cell of a master or secondary cell group is sometimes also referred to as the Special Cell (SpCell). Hence, the SpCell in the MCG is the PCell and the SpCell in the SCG is the PSCell.

There are different ways to deploy 5G networks with or without interworking with LTE (also referred to as E-UTRA) and evolved packet core (EPC). In principle, NR and LTE can be deployed without any interworking, denoted by NR stand-alone (SA) operation, also known as Option 2. In Option 1, an eNB (LTE) can be connected to EPC with no interconnection with a gNB.

On the other hand, the first supported version of NR uses dual connectivity, denoted as EN-DC (E-UTRAN-NR Dual Connectivity), also known as Option 3, as depicted in FIG. 2. In such a deployment, dual connectivity between NR and LTE is applied, where the UE is connected with both the LTE radio interface (LTE Uu in FIG. 2) to an LTE access node and the NR radio interface (NR Uu in FIG. 2) to an NR access node. Further, in EN-DC, the LTE access node acts as the master node (in this case known as the Master eNB, MeNB), controlling the master cell group, MCG, and the NR access node acts as the secondary node (in this case sometimes also known as the Secondary gNB, SgNB), controlling the secondary cell group, SCG. The SgNB may not have a control plane connection to the core network (EPC) which instead is provided MeNB and in this case the NR. This is also called as "Non-standalone NR" or, in short, "NSA NR". In this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, Option 2 supports stand-alone NR deployment where gNB is connected to 5GC. Similarly, LTE can also be connected to 5GC using Option 5 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes).

There are other variants of dual connectivity between LTE and NR which have been standardized as part of NG-RAN connected to 5GC. Under the MR-DC umbrella, there are:

- EN-DC (Option 3): LTE is the master node and NR is the secondary node (EPC CN employed, as depicted in FIG. 2)
- NE-DC (Option 4): NR is the master node and LTE is the secondary (5GCN employed)
- NGEN-DC (Option 7): LTE is the master node and NR is the secondary (5GCN employed)
- NR-DC (variant of Option 2): Dual connectivity where both the master node, MN, controlling the MCG, and the secondary node, SN, controlling the SCG, are NR (5GCN employed, as depicted in FIG. 3, which illustrates NR-DC).

As migration for these options may differ from different operators, it is possible to have deployments with multiple options in parallel in the same network. That is, there could be eNB base stations supporting Options 3, 5 and 7 in the same network as NR base stations supporting Options 2 and 4. In combination with dual connectivity solutions between LTE and NR, it is also possible to support CA (Carrier Aggregation) in each cell group (i.e. MCG and SCG) and dual connectivity between nodes on same RAT (e.g. NR-NR DC). For the LTE cells, a consequence of these different deployments is the co-existence of LTE cells associated to eNBs connected to EPC, 5GC or both EPC/5GC.

LTE DC and EN-DC are designed differently when it comes to what each node controls. In general, there are two options:

1. Centralized solution (like LTE-DC), and
2. Decentralized solution (like EN-DC).

FIG. 4 shows schematic control plane architectures for LTE DC, EN-DC and NR-DC. The main difference here is that in EN-DC and NR-DC, the SN has a separate NR RRC entity. This means that the SN can control the UE also, sometimes without the knowledge of the MN but often the SN need to coordinate with the MN. In LTE-DC, the RRC messages are always sent from the MN (MN to UE). Note however, the SN still decides the configuration of the SN, since it is only the SN itself that has knowledge of what kind of resources and capabilities it has.

For EN-DC and NR-DC, the major changes compared to LTE DC are:

- The introduction of split bearer from the SN (known as SCG split bearer)
- The introduction of split bearer for RRC The introduction of a direct RRC from the SN (also referred to as SCG SRB)

FIG. 5 shows, from the network perspective, the user plane protocol architecture in MR-DC with EPC (EN-DC). In this case, the network can configure either E-UTRA PDCP or NR PDCP for MN terminated MCG bearers while NR PDCP is always used for all other bearers.

FIG. 6 shows, from the network perspective, the user plane protocol architecture in MR-DC with 5GC (NGEN-DC, NE-DC and NR-DC). In MR-DC with 5GC, NR PDCP is always used for all bearer types. In NGEN-DC, E-UTRA RLC/MAC is used in the MN while NR RLC/MAC is used in the SN. In NE-DC, NR RLC/MAC is used in the MN while E-UTRA RLC/MAC is used in the SN. In NR-DC, NR RLC/MAC is used in both MN and SN.

Conditional PSCell Change (CPC) in Rel-16

Conditional handover allows a network to prepare a handover command that is to be applied upon the occurrence of a specified condition. Similar to conditional handover, a solution for Conditional PSCell Change (CPC) was standardized in Rel-16. In a CPC, a UE operating in MR-DC receives one or multiple RRC Reconfiguration(s) in a conditional reconfiguration. For example, the UE receives an RRCReconfiguration message containing an SCG configuration (e.g. a secondaryCellGroup of the IE CellGroupConfig) with a reconfigurationWithSync that is stored and associated to an execution condition (e.g., a condition such as an A3/A5 event configuration), so that one of the stored messages is only applied upon the fulfillment of the execution condition. For example, the condition may be associated with the serving PSCell, upon which the UE would perform a PSCell change (e.g., in case the UE finds a neighbor cell that is better than the current SpCell of the SCG).

CPC is supported in Rel-16, but in Rel-17 conditional PSCell Addition, known as Conditional PSCell Addition/Change (CPAC), will also be included. In Rel-16 only intra-SN CPC without MN involvement is standardized. Inter-SN PSCell CPC and CPC with MN involvement will be included in Rel-17.

Solutions for inter-SN CPC in Rel-17 are being discussed. One of the solutions, the so-called Solution 1, has the signaling flow shown in FIG. 7. As shown therein, the S-SN sends an SN Change Required message 702 to the MN indicating that an SN change is required. The MN sends SN addition requests 704 to one or more target SNs (T-SNs). When the T-SN has acknowledged the SN addition request with a SN Addition Request ACK message 706, the MN generates a CPC at block 708 and sends an RRCReconfiguration command 710 to the UE. Upon completion of the RRC reconfiguration as indicated by a RRCReconfigurationComplete message 712 from the UE, the MN sends an SN change confirmation 714 to the S-SN indicating the accepted candidates.

SUMMARY

A method performed by a first network node operating as a Master Node (MN) for a user equipment (UE) configured with Multi-Radio Dual Connectivity, includes receiving a first request for conditional PSCell change (CPC) for the UE from a source secondary node (S-SN), the first request indicating a plurality of candidate cells for PSCell configuration, and transmitting a second request for CPC to a candidate target secondary node (T-SN), the second request indicating one or more candidate cells of the plurality of candidate cells for PSCell configuration that are served by the T-SN, wherein the new candidate cell is not one of the one or more candidate cells. The method further includes receiving a response from the T-SN indicating that a subset of the identified candidate cells were accepted by the T-SN and/or identifying a new candidate cell for CPC for the UE, and determining whether or not to configure the UE with CPC based on the response from the T-SN.

The indication that the subset of the one or more candidate cells were accepted by the T-SN and/or the indication identifying the new candidate cell for CPC for the UE may include a list of cells and associated configuration to be applied upon execution of CPC.

The configuration may include a radio resource control, RRC, configuration containing a secondary cell group, SCG, configuration. The SCG configuration may include a ReconfigurationWithSync information element for the SCG.

The first request may include a secondary cell group measurement configuration, SCG MeasConfig, and an execution condition for performing CPC towards one or more of the plurality of candidate cells.

The method may further include transmitting a first message to the S-SN indicating that not all the suggested/requested candidate cells were accepted. The indication that not all the suggested/requested candidate cells were accepted may include the subset of selected cells by the T-SN.

The first message may include an indication as to whether the UE is configured with CPC for the subset of cells selected by the T-SN or whether the UE is not configured with CPC.

The method may further include configuring the UE for CPC with the subset of cells selected by the T-SN, and the first message may include an indication that the UE was configured for CPC with the subset of cells selected by the T-SN.

The method may further include, in response to configuring the UE for CPC, receiving from the UE a reconfiguration complete message, and including the reconfiguration complete message in the first message to indicate to the S-SN that the UE is configured with CPC for the subset of cells selected by the T-SN.

The first message may be a S-NODE CHANGE CONFIRM indicating that the UE has been configured with CPC. In some embodiments, the first message may indicate to the S-SN that the UE is not configured with CPC.

The method may further include, in response to transmitting (1410) the first message to the S-SN comprising the indication that not all the suggested/requested candidate cells were accepted, receiving from the S-SN a message configuring CPC for the subset of cells that has been accepted by the T-SN, the message including measurement configurations for CPC and execution conditions for CPC mapped to the subset of selected cells.

The method may further include determining not to configure the UE for CPC based on the response from the T-SN.

The method may further include storing a CPC configuration of the subset of cells selected by the T-SN for later use.

The response from the T-SN may indicate that none of the identified candidate cells were accepted by the T-SN and identifying a new candidate cell for CPC for the UE, and the method may further include storing a target candidate configuration for the new candidate cell for CPC, and transmitting a first message to the S-SN indicating that not all the suggested/requested candidate cells were accepted and identifying the new candidate cell for CPC.

The method may further include receiving a second message from the S-SN, wherein the second message may include a request for CPC for the new candidate cell for CPC, and in response to the second message, configuring the UE for CPC with the new candidate cell for CPC.

The second message may include a measurement configuration and execution conditions mapped to the new candidate cell for CPC.

The method may further include determining that the S-SN has not provided an execution condition and/or an SCG MeasConfig for CPC for the new candidate cell for CPC within a predetermined time period, and transmitting a CPC cancel message to the T-SN for the new candidate cell for CPC in response to determining that the S-SN has not provided an execution condition and/or an SCG MeasConfig for CPC for the new candidate cell for CPC within the predetermined time period.

The response from the T-SN may indicate that a subset of the identified candidate cells were accepted by the T-SN and identifying a new candidate cell for CPC for the UE, the and method may further include transmitting a first message to the S-SN indicating that not all the suggested/requested candidate cells were accepted and identifying the new candidate cell for CPC, and receiving a second message from the S-SN, wherein the second message may include a request for CPC for the new candidate cell for CPC and for the subset of identified candidate cells that were accepted by the T-SN, and in response to the second message, configuring the UE for CPC with the new candidate cell for CPC and with the subset of identified candidate cells that were accepted by the T-SN.

The second message may include a measurement configuration and execution conditions mapped to the new candidate cell for CPC.

The method may further include storing a target candidate configuration for the new candidate cell for CPC in response to the response from the T-SN.

The response from the T-SN may indicate that a subset of the identified candidate cells were accepted by the T-SN and identifying a new candidate cell for CPC for the UE, and the method may further include configuring the UE for CPC with the subset of identified candidate cells that were accepted by the T-SN, transmitting a first message to the S-SN identifying the new candidate cell for CPC, and receiving a second message from the S-SN, wherein the second message may include a request for CPC for the new candidate cell for CPC, and in response to the second message, configuring the UE for CPC with the new candidate cell for CPC.

The response from the T-SN may indicate a new cell as a candidate cell for CPC, the and method may further include receiving a second message from the S-SN, wherein the second message may include a request for CPC for the new cell by the T-SN.

The response from the T-SN may indicate that a subset of the identified candidate cells were accepted by the T-SN and identifying a new candidate cell for CPC for the UE, and the method may further include configuring the UE for CPC with the subset of identified candidate cells that were accepted by the T-SN, transmitting a first message to the S-SN identifying the new candidate cell for CPC, and transmitting a CPC cancel message to the T-SN for the new candidate cell for CPC in response to determining that the S-SN has not provided an execution condition and/or an SCG MeasConfig for CPC for the new candidate cell for CPC within the predetermined time period.

The method may further include transmitting the second request for CPC to a plurality of candidate T-SNs identifying one or more candidate cells of the plurality of candidate cells for PSCell configuration that are served by respective ones of the plurality of candidate T-SN, receiving responses from the plurality of candidate T-SNs indicating whether any of the identified candidate cells were accepted by the T-SN and/or identifying a new candidate cell for CPC for the UE, and determining whether or not to configure the UE with CPC based on the responses from the candidate T-SNs.

Some embodiments provide a method performed by a network node operating as a S-SN for a UE configured with Multi-Radio Dual Connectivity. The method includes transmitting from the S-SN to a master node, MN, a request for conditional PSCell change, CPC, for the UE the message identifying one or more candidate cells for CPC change, and receiving a message from the MN including an indication that a target secondary node, T-SN, has selected a subset of the one or more candidate cells for CPC.

The request may include a secondary cell group measurement configuration, SCG MeasConfig, and an execution condition for one or more of the candidate cells.

The message from the MN may include an indication of whether the UE has been configured with CPC for the subset of candidate cells.

The message from the MN indicates that the T-SN has selected a new candidate cell for CPC.

The method may further include, in response to the message from the MN, determining whether or not to configure the UE with CPC using the new candidate cell for CPC.

The new candidate cell may include a cell for which the S-SN has not provided an execution condition to the MN.

The method may further include determining to transmit a new CPC request to the MN for the new candidate cell and/or for the subset of target candidate cells selected by the T-SN.

The method may further include transmitting a new CPC request to the MN for the new candidate cell, wherein the new CPC request may include an SCG MeasConfig for CPC and the execution condition associated to the new candidate cell.

The method may further include determining that the MN has not configured the UE with CPC with the subset of selected target candidates, and determining not to configure the UE with CPC in response to the message from the MN.

The method may further include determining that the MN has not configured the UE with CPC with the subset of selected target candidates, and transmitting a new CPC request to the MN for the subset of target candidate cells, selected by the T-SN, including SCG MeasConfig for CPC and the execution condition associated to the new candidate cell, in response to determining that the MN has not configured the UE with CPC with the subset of selected target candidates.

The method may further include determining that the MN has configured the UE with CPC with the subset of selected target candidates, and transmitting a new CPC request to the MN including SCG MeasConfig for CPC and execution conditions associated to the new candidate cell.

The method may further include determining that the MN has configured the UE with CPC with the subset of selected target candidates, and determining not to configure the UE with CPC in response to the message from the MN.

DETAILED DESCRIPTION OF EMBODIMENTS

There currently exist certain challenge(s) with proposed solutions for inter-SN CPC. In particular, in one of the solutions being currently discussed in 3GPP for SN-initiated CPC, the S-SN selects a number of candidate target cells at a T-SN for CPC and prepares conditions for the selected cells. The T-SN is requested by the MN to provide configurations for the target cells (MN transmits an SN Addition Request and the T-SN can respond with an SN Addition Request Ack including the target candidate configuration(s)).

A problem with the proposed solution is if the T-SN selects only a subset of the target cells suggested by the source SN (possibly including all requested frequencies and/or also a subset of requested frequencies) or if the target SN selects different target cells than the source SN (e.g. possibly including a target candidate in a frequency that has not been indicated by the S-SN e.g. in the measurements received via the SN Addition Request), then the configuration that the source SN provided may not be relevant anymore.

Another problem may occur if the number of candidate cells that are configured by the S-SN and/or that the target SN selects causes the total number of conditional reconfigurations for the UE to become too large. There is an upper limit for how many conditional reconfigurations a UE may be configured with simultaneously, which for NR is defined by maxNrofCondCells-r16 with the value 8.

Certain aspects of the disclosure and their embodiments may provide solutions to these or other challenges. According to some embodiments, a method is provided for an MN to inform a S-SN about candidate target cells that were not accepted by the T-SN and to indicate a reason for the rejection. Some embodiments also provide a method for the MN to indicate to the S-SN new candidates that were selected by the T-SN but not requested by the S-SN.

Figure 14:
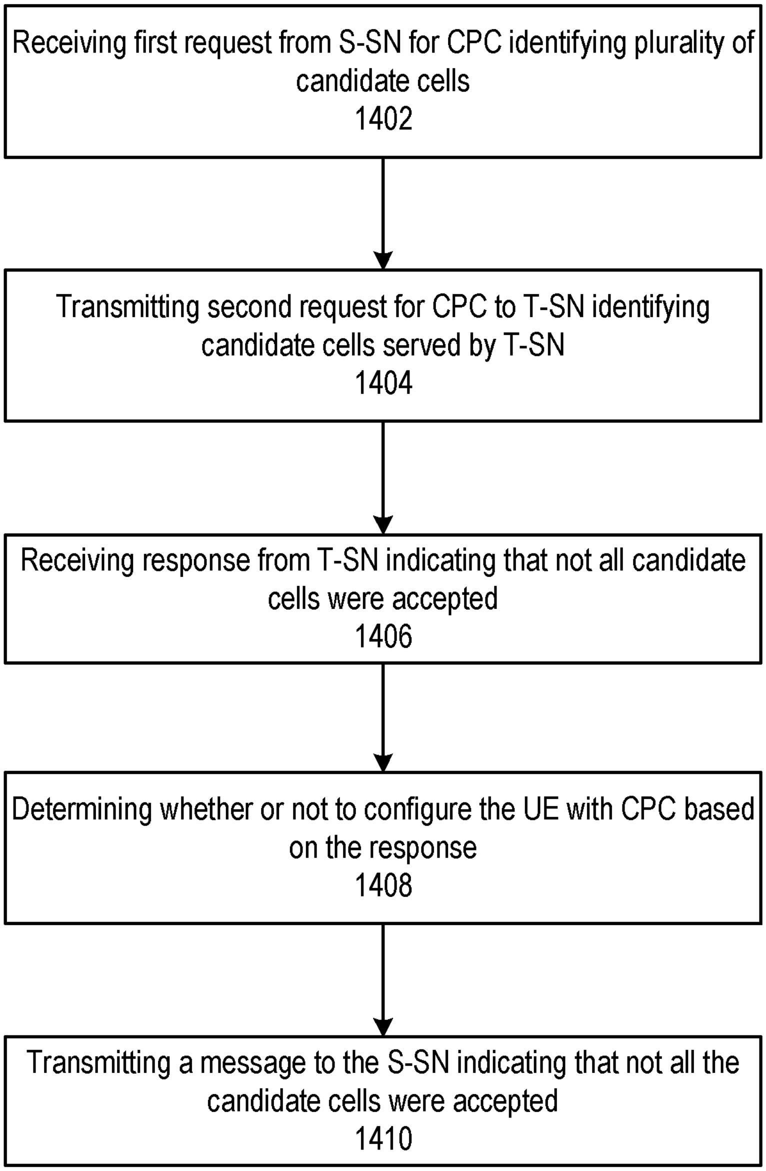
FIGS. 14 and 15 are flow charts that illustrate operations of network nodes according to various embodiments.

Referring to FIG. 14, a method performed by a first network node operating as a Master Node, MN, for a user equipment, UE, configured with Multi-Radio Dual Connectivity is illustrated. The method includes receiving (block 1402) a first request for conditional PSCell change, CPC, from a source secondary node, S-SN, the first request identifying a plurality of candidate cells for PSCell configuration, transmitting (block 1404) a second request for CPC to a candidate target secondary node, T-SN, the second request identifying one or more candidate cells of the plurality of candidate cells for PSCell configuration that are served by the T-SN, receiving (block 1406) a response from the T-SN indicating that a subset of the identified candidate cells were accepted by the T-SN, and determining (block 1408) whether or not to configure the UE with CPC based on the response from the T-SN.

The first request may include a secondary cell group measurement configuration, SCG MeasConfig, and an execution condition for one or more of the plurality of candidate cells.

The method may further include transmitting (block 1410) a first message to the S-SN indicating that not all the suggested/requested candidate cells were accepted.

The first message may include an indication as to whether the UE is configured with CPC for the subset of selected cells by the T-SN or whether the UE is not configured with CPC.

The method may further include receiving a second message from the S-SN, wherein the second message includes a request for CPC for the subset of cells selected by the T-SN.

The response from the T-SN may indicate a new cell as a candidate cell for CPC, and the method may further include receiving a second message from the S-SN, wherein the second message includes a request for CPC for the new cell by the T-SN.

The method may further include transmitting a CPC cancel message to the T-SN for a candidate cell for which the S-SN has not provided an execution condition and/or an SCG MeasConfig for CPC.

Figure 15:
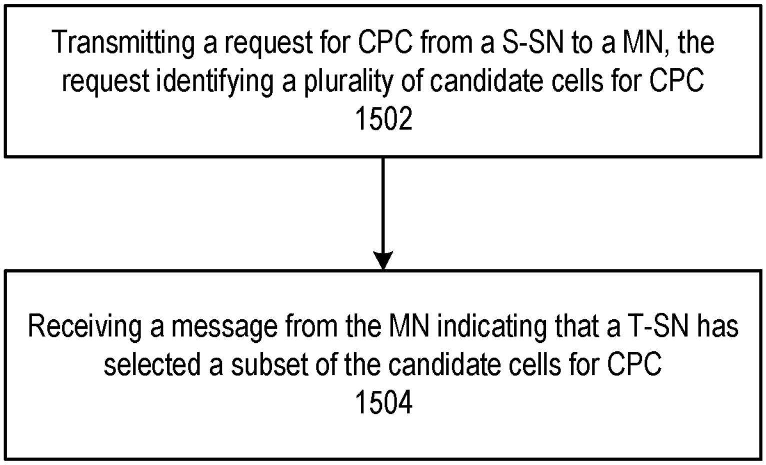

Referring to FIG. 15, a method performed by a network node operating as a source secondary node, S-SN, for a user equipment, UE, configured with Multi-Radio Dual Connectivity, includes transmitting (block 1502) from the S-SN to a master node, MN, a request for conditional PSCell change, CPC, the message identifying one or more candidate cells for CPC change, and receiving (block 1504) a message from the MN comprising an indication that a target secondary node, T-SN, has selected a subset of the one or more candidate cells for CPC.

The request may include a secondary cell group measurement configuration, SCG MeasConfig, and an execution condition for one or more of the candidate cells.

The message comprises an indication of whether the UE has been configured with CPC for the subset of candidate cells.

The message may include an indication that the T-SN has selected a new cell for CPC.

The new cell may include a cell for which the S-SN has not provided an execution condition to the MN.

The method may further include determining to transmit a new CPC request to the MN for the new candidate cell and/or for the subset of target candidate cells selected by the T-SN.

The method may further include transmitting a new CPC request to the MN for the new candidate cell, wherein the new CPC request comprises an SCG MeasConfig for CPC and the execution condition associated to the new candidate cell.

The method may further include determining that the MN has not configured the UE with CPC with the subset of selected target candidates, and transmitting a new CPC request to the MN for the subset of target candidate cells, selected by the T-SN, including SCG MeasConfig for CPC and the execution condition associated to the new candidate cell, in response to determining that the MN has not configured the UE with CPC with the subset of selected target candidates.

Certain embodiments may provide one or more of the following technical advantage(s). Some embodiments enable a T-SN, after selecting the most appropriate candidate cells for inter-SN CPC, to signal the accepted or rejected cells, along with a reason code, back to the S-SN via the MN. Upon receiving this information, the S-SN may take further actions, such as attempting other target cells for CPC, configuring the UE with CPC for some candidate target cells but not others, etc.

Some of the embodiments contemplated herein will now be described more fully with reference to the accompanying drawings. Embodiments are provided by way of example to convey the scope of the subject matter to those skilled in the art. Additional information may also be found in the document(s) provided in the Appendices.

Some embodiments described herein relate to a first network node operating as a MN, e.g. having a MCG configured to the UE and/or an MN-terminated bearer. The MN can be a gNodeB, or a Central Unit gNodeB (CU-gNB) or an eNodeB, or a Central Unit eNodeB (CU-gNB), or any network node and/or network function. Some embodiments described herein also relate to a second network node operating as a S-SN, e.g. having a SCG pre-configured (i.e. not connected to) to the UE. The S-SN can be a gNodeB, or a CU-gNB or an eNodeB, or a CU-gNB, or any network node and/or network function. Note that MN, S-SN and T-SN may be from the same or different Radio Access Technologies (and possibly be associated to different Core Network nodes).

The present description may refer to a "target secondary node (SN)", or "target SN." This is equivalent to saying this is a target candidate SN, or a network node associated to a target candidate PSCell that is being configured. If the UE would connect to that cell, transmissions and receptions with the UE would be handled by that node if the cell is associated to that node.

As described herein, a cell may reside in a node, e.g. a target candidate cell resides in the S-SN or the T-SN. That is equivalent to saying that a cell is managed by the node, or is associated to the node, or associated with the node, or that the cell belongs to the node, or that the cell is of the node.

"SN-initiated CPC" corresponds to a procedure wherein the Source SN for a UE configured with MR-DC determines to configure CPC. Upon determining to configure CPC, the Source SN selects, based on reported measurements, one or more target candidate cells (target candidate PSCell(s)) wherein at least one cell is associated to the Source SN, and at least another cell is associated to a neighbor SN. It can be said that if all target candidate cells are associated to the Source SN that is an "SN-initiated intra-SN CPC", which may be referred as the Release 16 solution. It can be said that if at least one target candidate cell is associated to the a neighbor SN that is an "SN-initiated inter-SN CPC", which may be referred as a Release 17 solution.

The present description refers to a candidate SN, or SN candidate, or an SN, as the network node (e.g. gNodeB) that is prepared during the CPA procedure and that can create an RRC Reconfiguration message with an SCG configuration (e.g. RRCReconfiguration**) to be provided to the UE and stored, with an execution condition, wherein the UE only applies the message upon the fulfillment of the execution condition. That candidate SN is associated to one or multiple PSCell candidate cell(s) that the UE can be configured with. The UE then can execute the condition and accesses one of these candidate cells, associated to a candidate SN that becomes the SN or simply the SN after execution (i.e. upon fulfillment of the execution condition).

The present description refers to a Conditional PSCell Change (CPC) configuration and procedures (like CPC execution), most of the time to refer to the procedure from the UE perspective. Other terms may be considered as synonyms, such as conditional reconfiguration, or Conditional Configuration (since the message that is stored and applied upon fulfillment of a condition is an RRCReconfiguration or RRCConnectionReconfiguration). One could also interpret conditional handover (CHO) in a broader sense, also covering CPA (Conditional PSCell Change) procedures. The present description refers to a Conditional SN Change most of the time to refer to the procedure from the UE perspective, to refer to procedures between network nodes wherein a node requests a target candidate SN (which may be the same as the Source SN or a neighbor SN) to configure a conditional PSCell Change (CPC) for at least one of its associated cells (cell associated to the target candidate SN).

The present description refers to CPAC as a way to refer to either a Conditional PSCell Addition (CPA) or a Conditional PSCell Change (CPC).

The present description refers to a neighbor SN and a Source SN as different entities, although both could be a target candidate SN for CPC.

The configuration of CPC can be done using the same IEs as conditional handover, which may be called at some point conditional configuration or conditional reconfiguration. The principle for the configuration is the same with configuring triggering/execution condition(s) and a reconfiguration message to be applied when the triggering condition(s) are fulfilled. The configuration IEs from [1] include ConditionalReconfiguration, CondConfigId, and CondConfigToAddModList.

In various embodiments described herein, these IEs are used differently. That is, they may sometimes be generated by the MN, sometimes generated by the S-SN, and sometimes by a candidate T-SN.

In the different embodiments described herein, the CPC is said to be in MN format when the CPC configuration is not configured as an MR-DC configuration in mrdc-SecondaryCellGroup (as defined in [1]). In other words, the UE receives an RRCReconfiguration from the MN that may contain the mrdc-SecondaryCellGroup (e.g. in case the UE is also configured with an SCG MeasConfig for inter-SN CPC) but the CPC is not within that container. That means the IEs listed above (e.g. the IE ConditionalReconfiguration) are not included in mrdc-SecondaryCellGroup.

In various embodiments, the CPC is said to be in SN format when the CPC configuration is configured as an MR-DC configuration in mrdc-SecondaryCellGroup (as defined in [1]). In other words, the UE receives an RRCReconfiguration from the MN that may contain the mrdc-SecondaryCellGroup and the CPC is within that container. That means the IEs listed above (e.g. the IE ConditionalReconfiguration) are included in mrdc-SecondaryCellGroup (e.g. within a series of other nested IEs).

The present description refers to a "target secondary node (SN)", or "target SN." This is equivalent to saying this is a target candidate SN, or a network node associated to a target candidate PSCell that is being configured.

FIGS. 8A to 13 illustrate message flows according to various embodiments. In particular, FIGS. 8A to 13 illustrate actions performed by a first network node operating as a Master (MN), a second network node operating as a Target candidate Secondary Node for CPC (T-SN) and a third Source Secondary Node, for a UE configured with Multi-Radio Dual Connectivity, wherein actions from one network node leads to different actions from another network node. In FIGS. 8A to 13, various embodiments are illustrated for different scenarios in which, upon the reception of an SN Addition Request for CPC, the T-SN candidate responds as follows T-SN only accepts a subset of cells, T-SN accepts all cells and adds a new cell, or T-SN accepts a subset of cells and adds a new cell.

Figure 1:
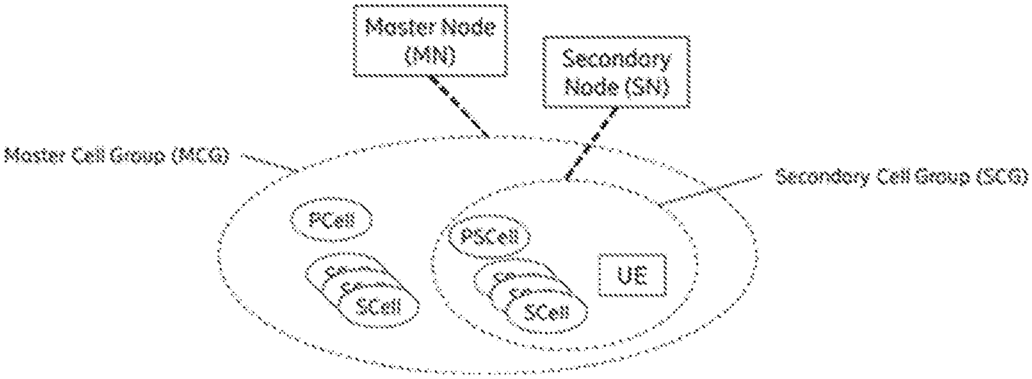
FIG. 1 illustrates dual connectivity combined with carrier aggregation in MR-DC.
Figure 2:
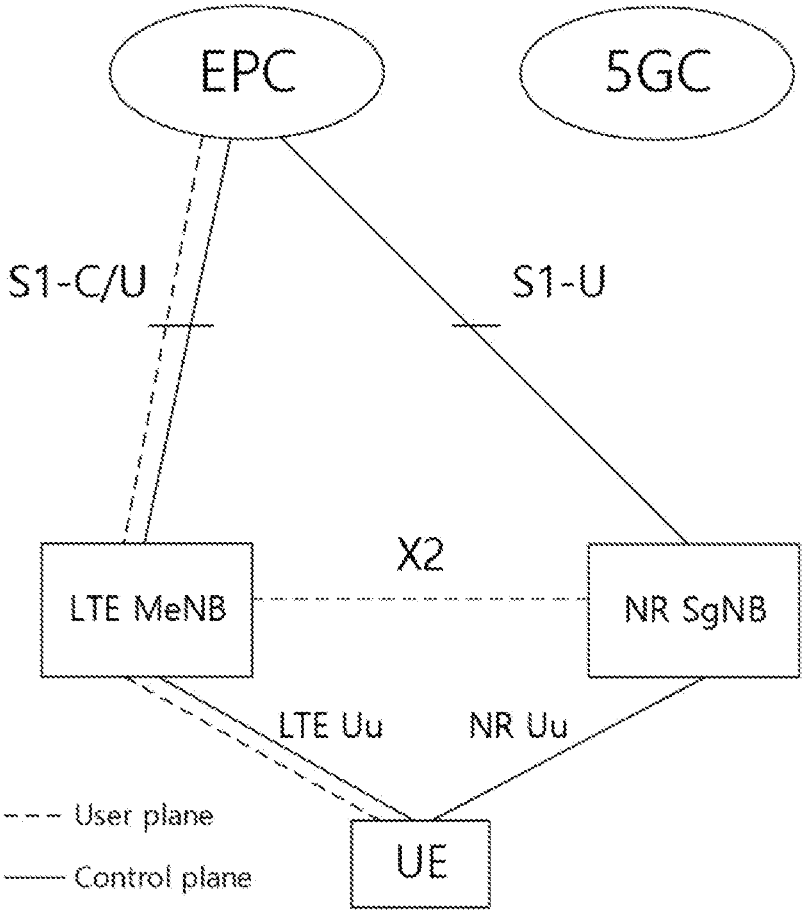
FIG. 2 illustrates UTRAN-NR Dual Connectivity.
Figure 3:
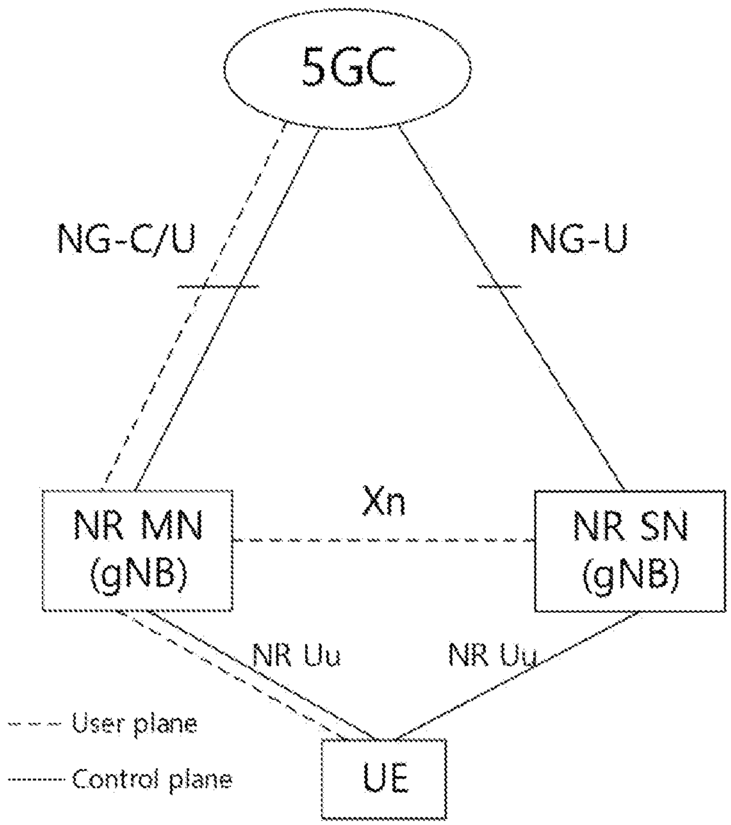
FIG. 3 illustrates NR Dual Connectivity.
Figure 4:
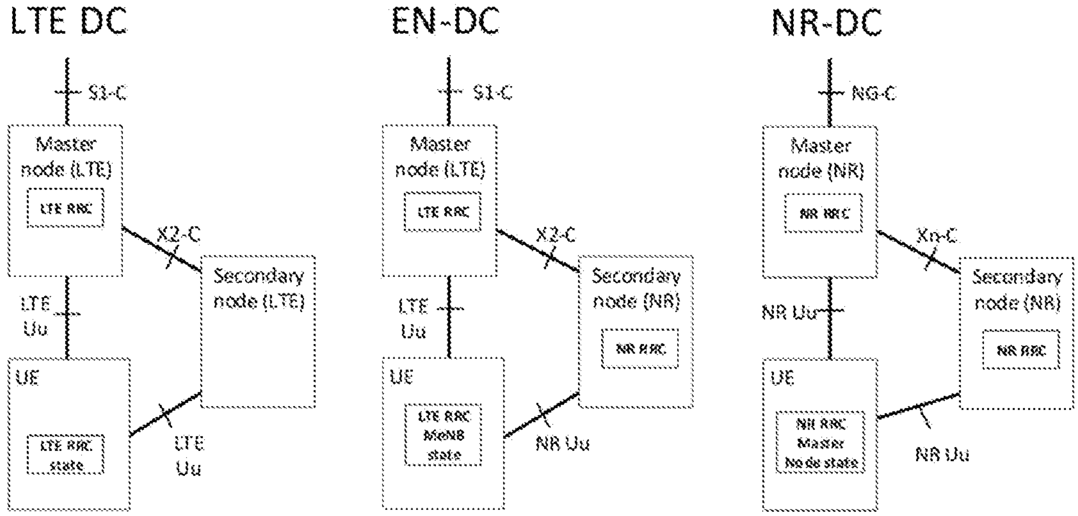
FIG. 4 illustrates schematic control plane architectures for LTE DC, EN-DC and NR-DC.
Figure 5:
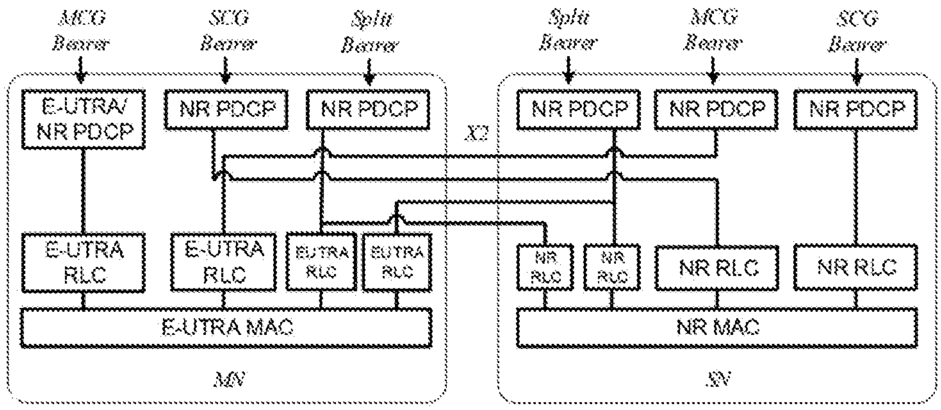
FIG. 5 illustrates a user plane protocol architecture in MR-DC with EPC.
Figure 6:
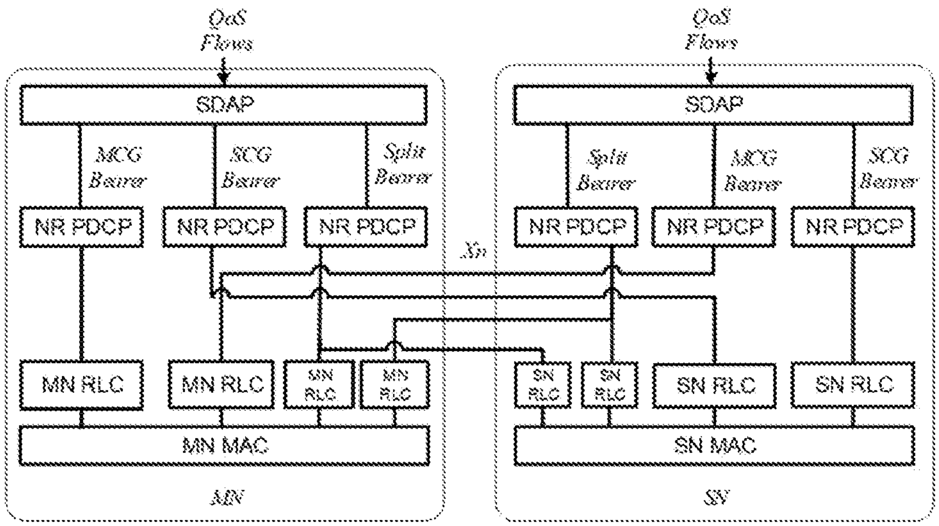
FIG. 6 illustrates a user plane protocol architecture in MR-DC with 5GC.
Figure 7:
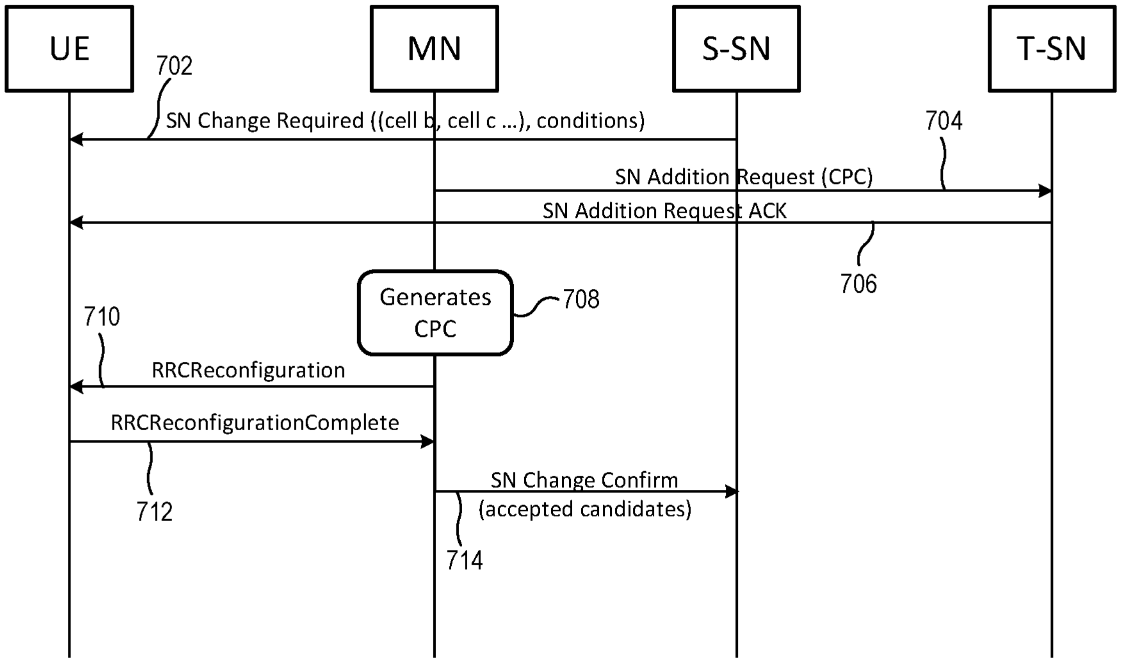
FIG. 7 illustrates a signalling diagram for inter-SN CPC.
Figure 8A:
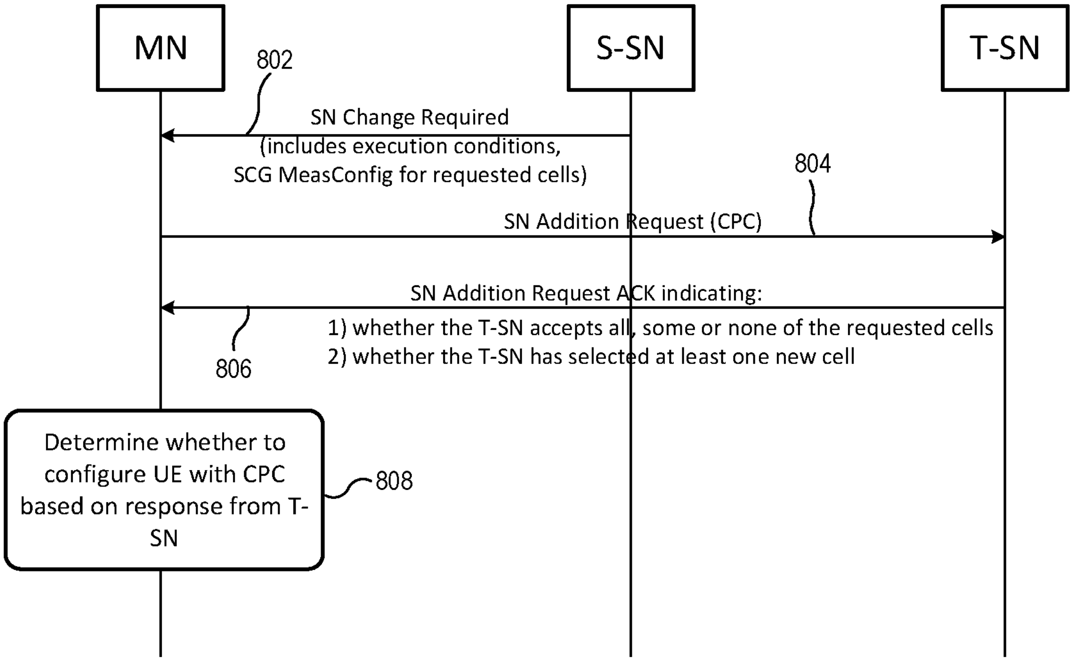
FIGS. 8A, 8B, 8C and 9 to 13 are flow diagrams that illustrate message flows according to various embodiments.

FIG. 8A illustrates an example in which a T-SN only accepts a subset of cells for which the S-SN has prepared SCG MeasConfig and execution conditions.

In particular, referring to FIG. 8A, some embodiments provide a method performed by a first network node operating as a MN for a UE configured with Multi-Radio Dual Connectivity. In the method, the MN receives a request 802 for CPC from a network node operating as the S-SN. The request may correspond to an S-NODE CHANGE REQUIRED message including an indication this is for a Conditional Reconfiguration e.g. a CPC, e.g., as in an SN-initiated CPC. The request may include at least one execution condition configuration for CPC (e.g. one or two measId(s), possibly in SN format) mapped to at least one target candidate cell in a frequency carrier. The request can possibly be included in an inter-node RRC message/container (e.g. CG-Config).

An example is shown below where the "execution condition" can correspond to the field condExecutionCond2-r17 of IE CondReconfigExecCond-r17, wherein CondReconfigExecCond-r17 is of IE MeasId. The target candidate cell is indicated by a cell identifier, such as the Physical Cell Identifier (field physCellId of IE PhysCellId) and the carrier frequency indicated by the Synchronization Sequence Block (SSB) frequency (e.g. field ssbFrequency of IE ARFCN-ValueNR). A signaling example for the IEs of CG-Config is shown in the ASN.1 listing of Table 1.

TABLE 1

ASN.1 Listing of CG-Config Example

```
CG-Config-IEs ::=               SEQUENCE {
[...]
  candidateCellInfoListSN          OCTET STRING (CONTAINING MeasResultList2NR)      OPTIONAL,
[[
  candidateCellInfoListCPC-r17      CandidateCellInfoList-CPC
  OPTIONAL,
]]
CandidateCellInfoList-CPC ::=         SEQUENCE (SIZE (1..FFS)) OF CandidateCellInfo
CandidateCellInfo ::=             SEQUENCE {
  ssbFrequency                  ARFCN-ValueNR                               OPTIONAL,
  candidateCellList                 SEQUENCE (SIZE (1..FFS)) OF CandidateCellInfo2 OPTIONAL,
]
CandidateCellInfo2::=               SEQUENCE {
  physCellId                    PhysCellId                                  OPTIONAL,
  condExecutionCond2-r17              OCTET STRING (CONTAINING CondReconfigExecCond-r17)
  OPTIONAL
}
}
CondReconfigExecCond-r17 ::= SEQUENCE (SIZE (1..2)) OF MeasId
```

The request may include the SCG MeasConfig including the measurement configuration for CPC, i.e. the configuration of the measId(s) referred in the execution conditions and associated measurement object and report configuration.

The method further includes transmitting a request 804 for CPC to a candidate T-SN. The request can be an S-NODE ADDITION REQUEST message over XnAP possibly including information (e.g. measurements) for candidate target cells, and possibly including an indication that the request is for CPC.

The method further includes receiving a response 806 from the candidate T-SN indicating that not all the suggested/requested candidate cells were accepted. The so called "suggested/requested candidate cells" are the cells for which the S-SN has provided the MN with execution conditions and the SCG MeasConfig including the measId(s) associated.

The response may contain an indication enabling the MN to determine which cells were selected by the T-SN. Based on the indication, the MN can determine at least one of the following:

(1) Whether the T-SN has selected a subset of the suggested/requested cells, i.e. cells for which the S-SN has provided the execution conditions and the SCG MeasConfig for CPC;

(2) Whether the T-SN has selected at least one new cell for CPC, i.e. a cell that is not a cell for which the S-SN has provided the execution conditions and the SCG MeasConfig for CPC; or (3) Whether the T-SN has selected both: at least one new cell (i.e. a cell that is not a cell for which the S-SN has provided the execution conditions and the SCG MeasConfig for CPC) and a subset of cells for which the S-SN has provided the execution conditions and the SCG MeasConfig for CPC.

The indication can be a list of cells and the associated RRC Reconfiguration to be applied upon execution (i.e. containing the SCG configuration including the IE ReconfigurationWithSync for the SCG).

In one option, the T-SN does not need to be aware of the cells requested/suggested by the S-SN (and indicated via the MN by the S-NODE ADDITION REQUEST). In another option, the T-SN is aware of the cells requested/suggested by the S-SN (and indicated via the MN by the S-NODE ADDITION REQUEST), so it can give some preference to these suggested/selected cells by the S-SN.

Upon receiving the response from the candidate Node (T-SN), the MN determines at block 808 whether to configure the UE or not with CPC based on the response and indicating to the S-SN that not all the suggested/requested candidate cells were accepted.

If the MN determines that the T-SN has selected a subset of the suggested/requested cells, i.e. cells for which the S-SN has provided the execution conditions and the SCG MeasConfig for CPC, the MN determines at block 808 whether to configure the UE or not, and indicates that decision to the S-SN. including an indication of the subset of cells selected by the T-SN.

In some embodiments, if the T-SN has selected a subset of the suggested/requested cells, the MN can determine to configure the UE with CPC, with at least the suggested/requested candidate cell(s) that have been accepted by the T-SN.

Figure 8B:
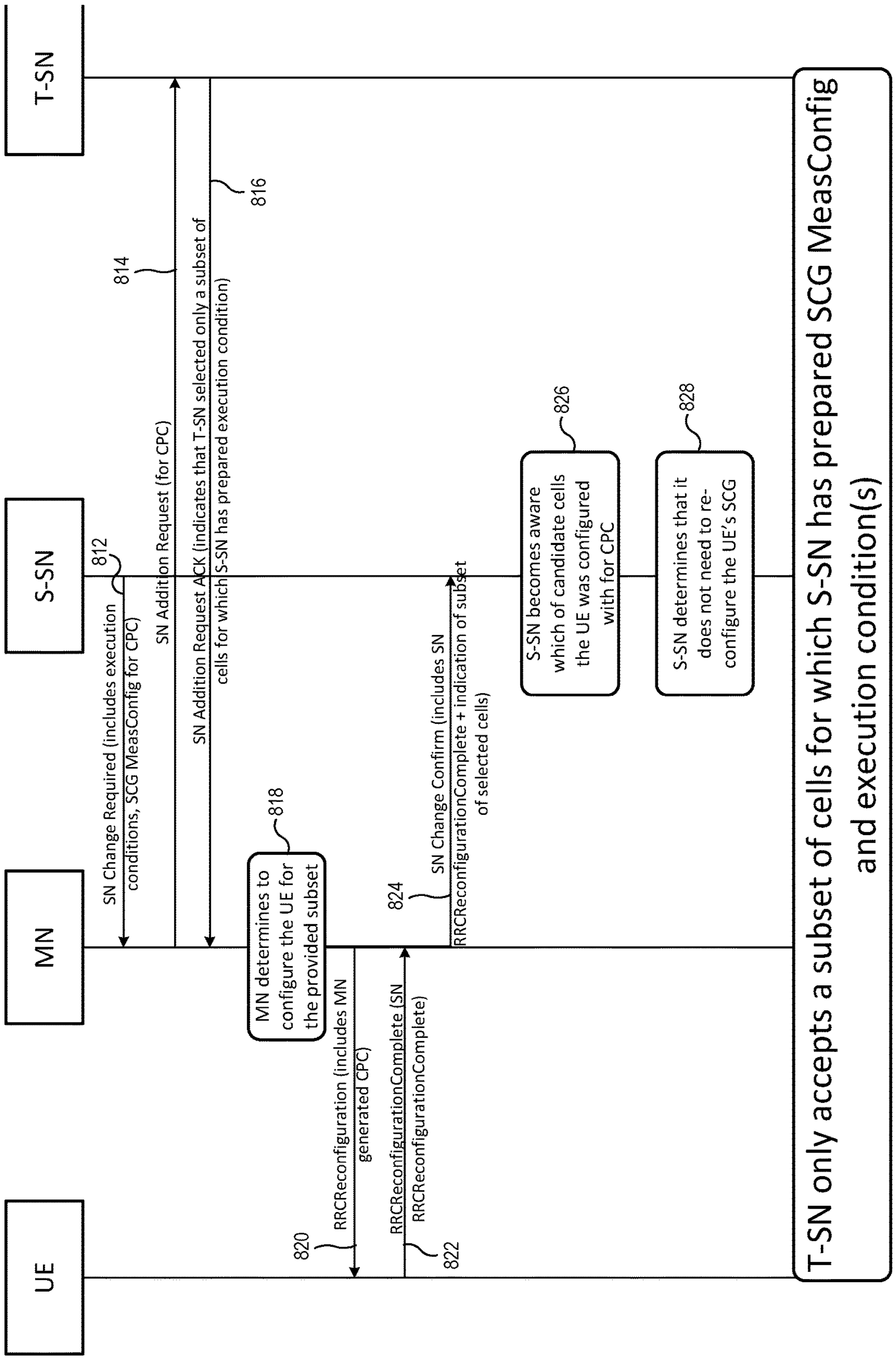

For example referring to FIG. 8B, the MN receives an SN Change Required message 812 from the S-SN, and in response sends an SN addition request 814 to a T-SN. The SN Addition Request 814 includes measurement conditions (SCG MeasConfig) and execution conditions for one or more cells served by the T-SN that are suggested/requested for CPC. The T-SN responds with a SN Addition Request ACK message 816 that indicates that the T-SN has selected only a subset of the suggested/requested cells identified in the SN Addition Request.

At block 818, the MN determines, in response to the SN Addition Request ACK message 816, to configure the UE for CPC based on the subset of cells indicated by the T-SN.

The MN then transmits an RRC Reconfiguration with CPC message 820 to the UE, including the SCG MeasConfig for CPC from the S-SN as an SCG Reconfiguration, and the execution condition for each target candidate cell in the selected subset. The MN receives an RRC Reconfiguration Complete message 822 from the UE, including an embedded SN/SCG RRC Reconfiguration Complete (forwarded by the MN to the S-SN).

Upon configuring CPC, i.e., upon receiving the complete message from the UE, the MN transmits a message 824 to the S-SN indicating that CPC has been configured for the subset of cells selected by the T-SN (so that the S-SN becomes aware that CPC was not configured for all requested/suggested cells). The message 824 can correspond to an "S-NODE CHANGE CONFIRM" message, and includes at least the SCG RRCReconfigurationComplete (received from the UE) and an indication of the subset of selected cells.

At block 826, the S-SN becomes aware of which candidate cells the UE was configured with for CPC, and in the example of FIG. 8B, at block 828, the S-SN determines that it does not need to reconfigure the UE's SCG.

In some embodiments, upon receiving an SN Addition Request ACK message 816, the MN can determine not to configure the UE with CPC, as not all suggested/requested candidate cell(s) have been accepted by the T-SN. In that case, the MN transmits a message to the S-SN indicating that CPC has not been configured at the UE.

Figure 8C:
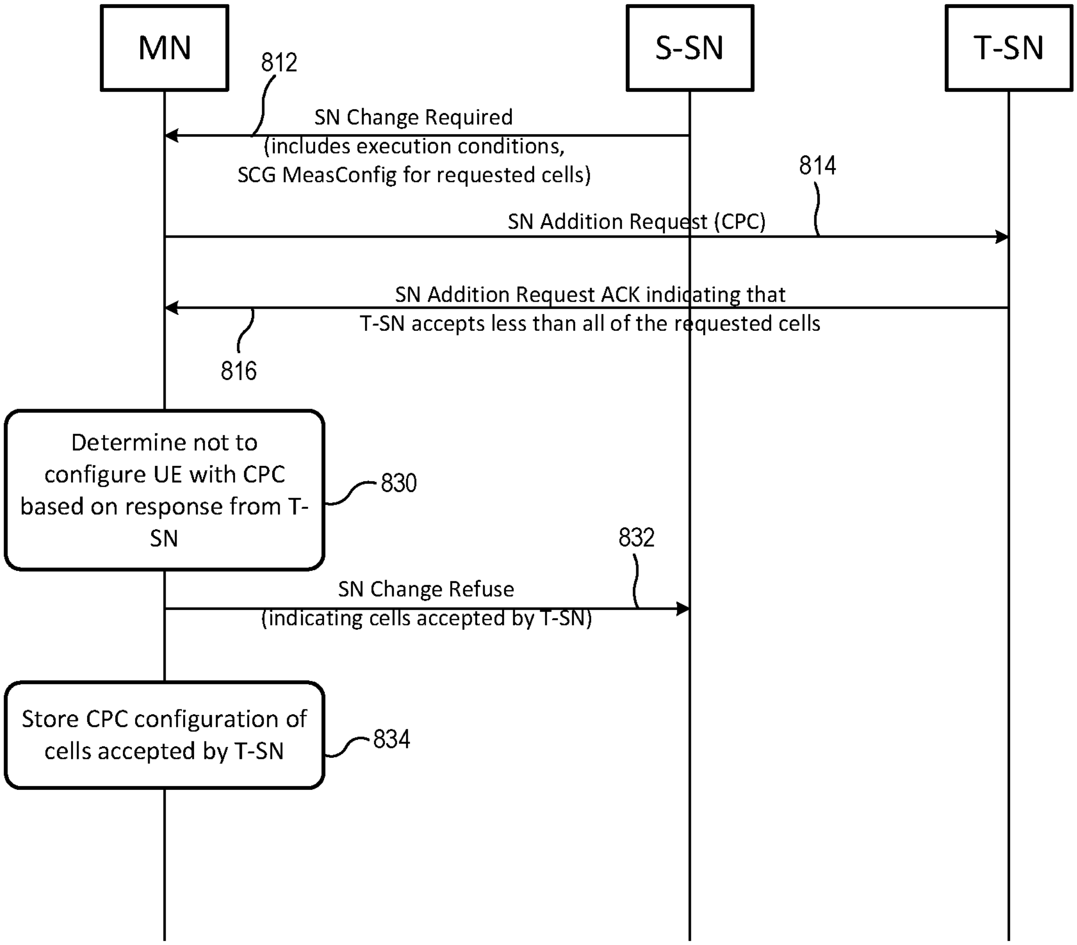

For example, referring to FIG. 8C, the MN receives an SN Change Required message 812 from the S-SN, and in response sends an SN addition request 814 to a T-SN. The SN Addition Request 814 includes measurement conditions (SCG MeasConfig) and execution conditions for one or more cells served by the T-SN that are suggested/requested for CPC. The T-SN responds with a SN Addition Request ACK message 816 that indicates that the T-SN has selected only a subset of the suggested/requested cells identified in the SN Addition Request.

At block 830, the MN determines not to configure the UE with CPC based on the SN Addition Request ACK message 816 from the T-SN.

The MN then sends a message 832 to the S-SN indicating that CPC has not been configured at the UE. The message 850 can correspond to an SN CHANGE REFUSE, and may include an indication of the subset of selected cells by the T-SN, and possibly a cause value. Thanks to that, the S-SN becomes aware that CPC was not configured at the UE, so the S-SN can possibly trigger another SN CHANGE REQUIRED, this time only for the subset that has been accepted by the T-SN, the SCG MeasConfig for CPC and the execution conditions mapped to the subset of selected cells in a new S-NODE CHANGE REQUIRED from the S-SN to the MN.

At block 834, upon receiving the S-NODE ADDITION REQUEST ACK with the configurations for the subset of cells, and upon having transmitted the SN CHANGE REFUSE message 832, the MN stores the configurations for the subset of cells selected by the T-SN for at least some period of time (e.g., until the expiration of a timer). That is done so that if the S-SN sends another SN CHANGE REQUIRED for the same subset of cells for which the MN has already stored the configurations, the MN does not need to trigger a new SN Addition Request towards the T-SN.

If, upon receipt of the SN Addition Request ACK message from the T-SN, the MN determines that the T-SN has selected only new cell(s) for CPC, i.e. cell(s) that is/are not ones for which the S-SN has provided the execution conditions and the SCG MeasConfig for CPC, the MN may indicate to the S-SN that the change is refused (by transmitting an SN CHANGE REFUSE) and including an indication of the new cell(s) selected by the T-SN. The S-SN, upon having received that indication, can trigger a new SN CHANGE REQUIRED for CPC, or skip CPC.

Figure 9:
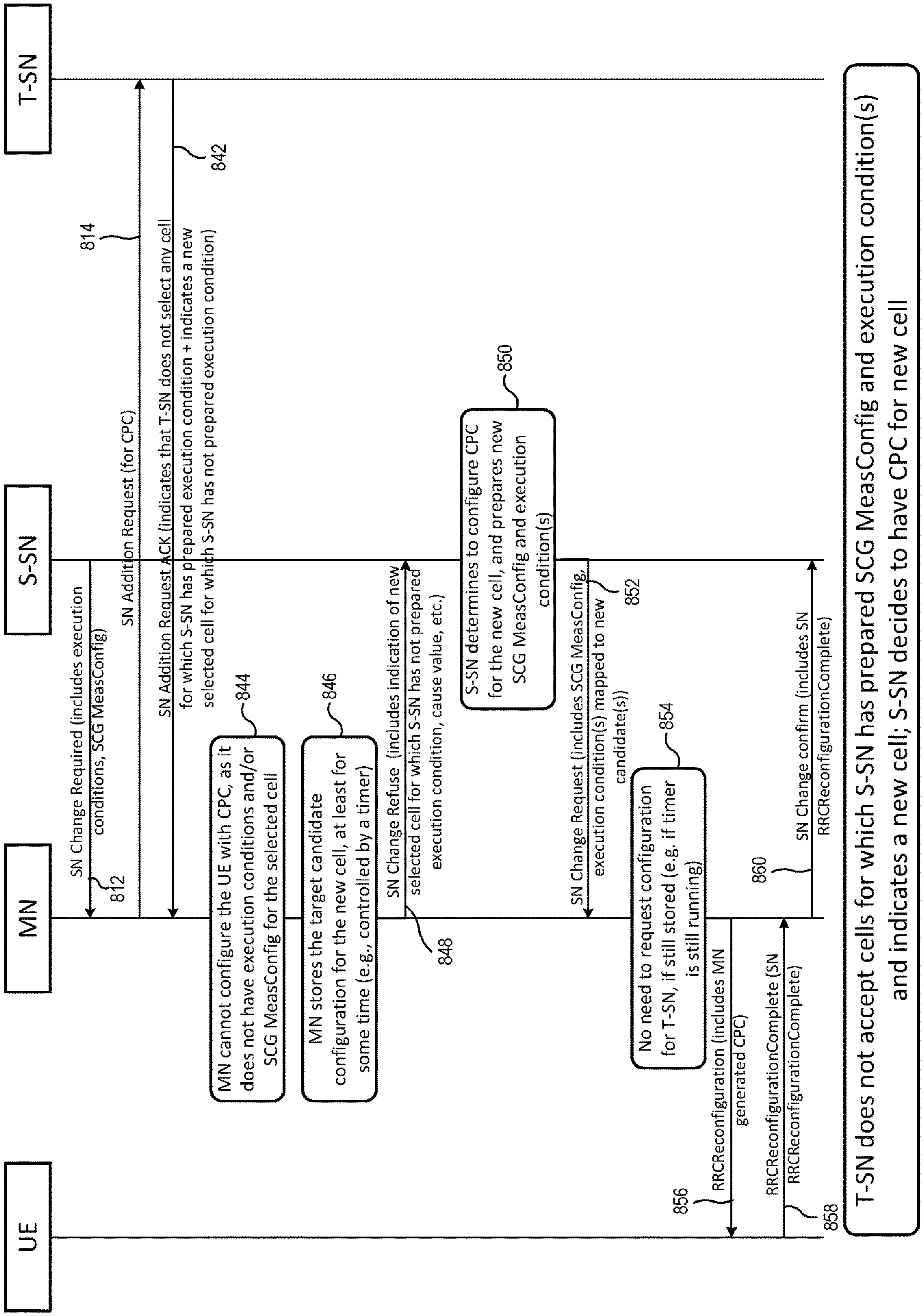

FIG. 9 illustrates an example in which T-SN does not accept cells for which the S-SN has prepared SCG MeasConfig and execution conditions, and indicates a new cell. In this example, the S-SN decides to have CPC for the new cell. Referring to FIG. 9, the MN receives an SN Change Required message 812 from the S-SN, and in response sends an SN addition request 814 to a T-SN. The SN Addition Request 814 includes measurement conditions (SCG MeasConfig) and execution conditions for one or more cells served by the T-SN that are suggested/requested for CPC. The T-SN responds with a SN Addition Request ACK message 816 that indicates that the T-SN has not selected any of the suggested/requested cells identified in the SN Addition Request but has selected one or more new cells for which the S-SN has not prepared execution condition(s) or a measurement configuration.

At block 844, the MN determines that it cannot configure the UE with CPC, as it does not have execution conditions or a measurement configuration (SCG MeasConfig) for the new selected cell(s).

At block 846, the MN stores the target candidate configuration for the new cell(s), at least until the expiration of a timer.

The MN then sends an SN Change Refuse message 848 to the S-SN with an indication of the new selected cell(s) along with a cause value, At block 850, the S-SN determines to configure CPC for the new cell(s), and prepares execution condition(s) and a measurement configuration for the new target candidate(s). The S-SN then sends an SN Change Request message 852 to the MN including execution condition(s) and a measurement configuration for the new target candidate(s).

At block 854, the MN determines that there is no need to request a configuration from the T-SN if the configuration for the new cell(s) is still stored.

The MN then transmits an RRC Reconfiguration with CPC message 856 to the UE, including the SCG MeasConfig for CPC from the S-SN as an SCG Reconfiguration, and the execution condition for the new target candidate cell(s). The MN receives an RRC Reconfiguration Complete message 858 from the UE, including an embedded SN/SCG RRC Reconfiguration Complete (forwarded by the MN to the S-SN).

Upon configuring CPC, i.e., upon receiving the complete message from the UE, the MN transmits a SN Change Confirm message 860 to the S-SN indicating that CPC has been configured for the new selected cell(s).

As noted above, upon receiving the S-NODE ADDITION REQUEST ACK message 842 with the T-SN' configurations for the subset of cells, and upon having transmitted the SN CHANGE REFUSE message 848, the MN stores for some time the target candidate's configurations for the subset of selected cells by the T-SN at block 848. That is done so if the S-SN sends another SN CHANGE REQUIRED for these cells, the MN has already the target configurations stored and does not need to trigger a new SN Addition Request towards the target candidate SN.

In some embodiments, the method includes transmitting a message 848 to a source Secondary Node (SN), the message indicating that some candidate target cell(s) for CPC were selected by the target SN and some candidate target cell(s) were not selected (or rejected) by the target SN.

The message may be an S-NODE CHANGE CONFIRM message as shown in FIG. 8B or an S-NODE CHANGE REFUSE message as shown in FIG. 9. The accepted target cells may be included in the target SN configuration in CG-ConfigInfo.

The message may include a list containing only the cells selected by the target SN but not by the source SN. Alternatively, all selected cells may be included in a list. The rejected target cells may be implicitly indicated by not being part of the target SN configuration in CG-ConfigInfo. Alternatively, the rejected target cells may be included as a (list of) cells.

The message may optionally include a cause value for the rejection.

Alternatively, the MN may transmit a message to a source Secondary Node (SN) indicating the candidate target cell(s) for CPC that were not selected (or rejected) by the target SN.

Still referring to FIG. 9, the message may be an S-NODE CHANGE REFUSE message 848. The rejected target cells may be included in the message as a (list of) cells. Alternatively, the rejected target cells may be implicitly indicated a not being part of the target SN configuration in the CG-ConfigInfo IE. The message may optionally include a cause value for the rejection. The cause value could be, for example, a lack of resources, load distribution reason, or other reason.

The MN may receive a new conditional S-NODE CHANGE REQUEST message 852 (or CPC Request) from the source SN, including a list of target cells to be configured for CPC, among the cells selected by the target SN, but not configured yet. The request 852 may include a list of additional target cells to be configured, these cells belonging to the T-SN and/or the attached executing conditions for these cells As an option, multiple S-NODE CHANGE REFUSE messages 848 may be sent to the S-SN. There may be one S-NODE CHANGE REFUSE message per candidate target SN. There may be one S-NODE CHANGE REFUSE message per candidate target cell.

Figure 10:
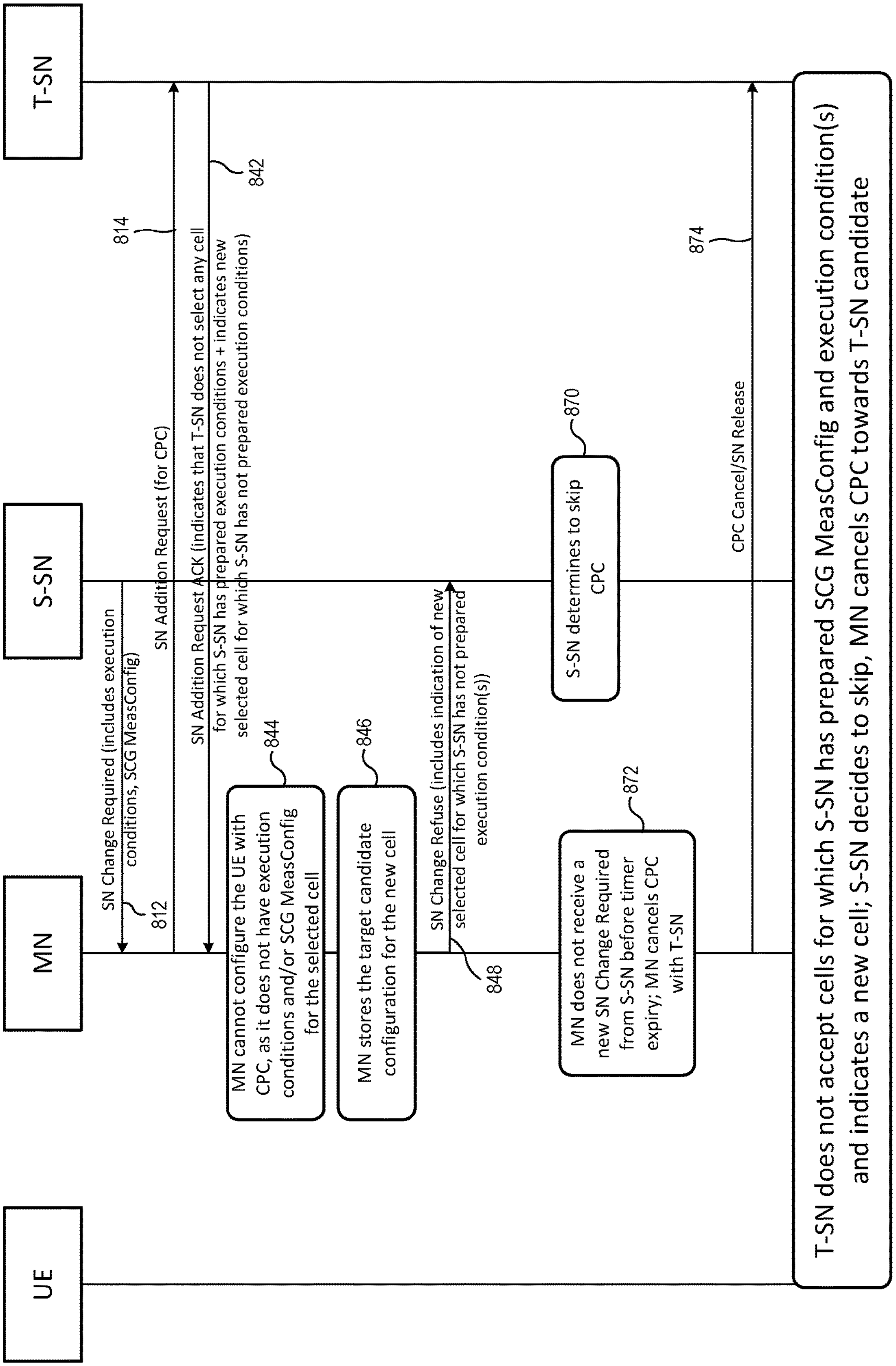

In some embodiments, the S-SN may determine to skip CPC if the T-SN does not select any of the cells for which the S-SN prepared execution conditions and a measurement configuration. FIG. 10 illustrates an example in which the T-SN does not accept cells for which the S-SN has prepared SCG MeasConfig and execution conditions, and indicates a new cell. In this example, the S-SN decides to skip CPC, and the MN cancels CPC toward the T-SN candidate. Referring to FIG. 10, the MN receives an SN Change Required message 812 from the S-SN, and in response sends an SN addition request 814 to a T-SN. The SN Addition Request 814 includes measurement conditions (SCG MeasConfig) and execution conditions for one or more cells served by the T-SN that are suggested/requested for CPC. The T-SN responds with a SN Addition Request ACK message 816 that indicates that the T-SN has not selected any of the suggested/requested cells identified in the SN Addition Request but has selected one or more new cells for which the S-SN has not prepared execution condition(s) or a measurement configuration.

At block 844, the MN determines that it cannot configure the UE with CPC, as it does not have execution conditions or a measurement configuration (SCG MeasConfig) for the new selected cell(s). At block 846, the MN stores the target candidate configuration for the new cell(s), at least until the expiration of a timer. The MN then sends an SN Change Refuse message 848 to the S-SN with an indication of the new selected cell(s) along with a cause value, At block 870, the S-SN determines to skip CPC for the UE in response to the SN Change Refuse message 848.

At block 872, since the MN does not receive another SN Change Required message following the SN Change Refuse message 848 before expiration of a timer, the MN cancels CPC with the T-SN. The MN then sends a CPC Cancel/SN release message 874 to the T-SN.

Still referring to FIG. 10, if the MN determines at block 844 that the T-SN has selected both new cell(s) i.e. cell(s) that is/are not a cell for which the S-SN has provided the execution conditions and the SCG MeasConfig for CPC, and a subset of cells for which the S-SN has provided the execution conditions and the SCG MeasConfig for CPC, the MN determines whether it will configure the UE with the subset of cells, or whether it should refuse the whole CPC request from the S-SN.

As shown in FIG. 8C, in some embodiments, the MN can determine not to configure the UE with CPC, as not all suggested/requested candidate cell(s) have been accepted by the T-SN. In that case, the MN transmits a message 832 to the S-SN indicating that CPC has not been configured at the UE.

The message can correspond to an SN CHANGE REFUSE, and may include an indication of the subset of selected cells by the T-SN, and possibly a cause value. As a result, the S-SN becomes aware that CPC was not configured at the UE, so the S-SN can possibly trigger another SN CHANGE REQUIRED, this time only for the subset that has been accepted by the T-SN, the SCG MeasConfig for CPC and the execution conditions mapped to the subset of selected cells in a new S-NODE CHANGE REQUIRED from the S-SN to the MN.

Referring again to FIG. 10, in some embodiments, the MN may transmit a CPC cancel message 874 to the T-SN for the target candidate cell(s) for which the S-SN has not provided an execution condition and/or an SCG MeasConfig for CPC.

In one option the CPC cancel/release action is triggered by the MN upon the MN having received from the T-SN an indication that the T-SN has selected a new cell for CPC (i.e. a cell for which the S-SN has not provided execution condition(s) and/or SCG MeasConfig for CPC). and upon determining that the S-SN has not provided an additional CPC request for that new cell.

The determination step at the MN that the S-SN has not provided an additional CPC request for that new cell can be done as follows. The MN may start a timer upon reception from the T-SN of the indication that the T-SN has selected a new cell for CPC (i.e. a cell for which the S-SN has not provided execution condition(s) and/or SCG MeasConfig for CPC). The MN stores the target candidate configuration for the new cell while the timer is running. If the MN receives an SN CHANGE REQUIRED for the new cell, the timer is stopped. The MN generates CPC for configuring the UE.

If the timer expires before the MN receives an SN CHANGE REQUIRED for the new cell, the MN deletes/releases the stored target candidate configuration for the new cell. and the MN triggers the CPC cancel towards the T-SN.

Figure 11:
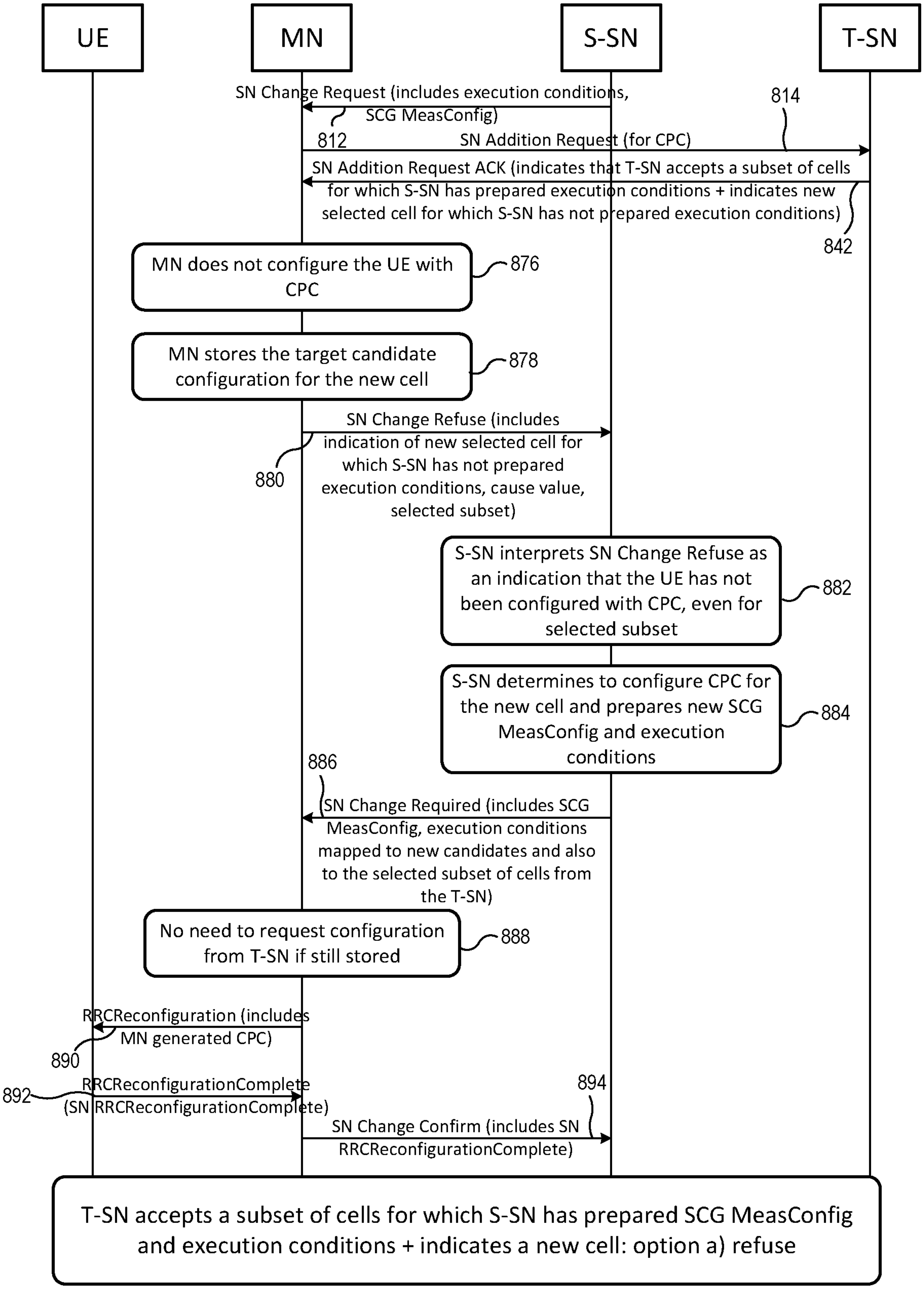

FIG. 11 illustrates an example in which T-SN accepts a subset of cells for which the S-SN has prepared SCG MeasConfig and execution conditions and indicates a new cell with an SN CHANGE REFUSE message. Referring to FIG. 11, the MN receives an SN Change Required message 812 from the S-SN, and in response sends an SN addition request 814 to a T-SN. The SN Addition Request 814 includes measurement conditions (SCG MeasConfig) and execution conditions for one or more cells served by the T-SN that are suggested/requested for CPC. The T-SN responds with a SN Addition Request ACK message 842 that indicates that the T-SN has selected a subset of the suggested/requested cells identified in the SN Addition Request and has selected one or more new cells for which the S-SN has not prepared execution condition(s) or a measurement configuration.

At block 876, the MN does not configure the UE with CPC based on the response from the T-SN, but at block 878, the MN stores the target candidate configuration for the new cell.

The MN then sends an SN Change Refuse message 880 to the S-SN that includes an indication of the new selected cells, an indication of the selected set of cells for which the S-SN provided execution conditions and a measurement configuration, and a cause value.

At block 882, the S-SN interprets the SN Change Refuse message as an indication that the UE has not been configured with CPC, even for the selected subset of requested cells, and at block 884, the S-SN determines to configure the UE for CPC for the new cell. The S-SN then prepares execution conditions and a measurement configuration for the new cell.

The S-SN then sends a SN Change Required message 886 to the MN including the execution conditions and a measurement configuration for the new cell and also for the selected subset of requested cells.

At block 888, if the target configuration for the new cell is still stored at the MN, the MN determines that there is no need to request the configuration from the T-SN.

The MN then transmits an RRC Reconfiguration with CPC message 890 to the UE, including the SCG MeasConfig for CPC from the S-SN as an SCG Reconfiguration, and the execution condition for the new target candidate cell(s) and the subset of requested cells. The MN receives an RRC Reconfiguration Complete message 892 from the UE, including an embedded SN/SCG RRC Reconfiguration Complete.

Upon receiving the RRCReconfigurationComplete message from the UE, the MN transmits a SN Change Confirm message 894 to the S-SN indicating that CPC has been configured for the new selected cell(s) and the subset of requested cells.

In some embodiments, the MN can determine to configure the UE with CPC, with at least the suggested/requested candidate cell(s) that have been accepted by the T-S. That is, the MN transmits an RRC Reconfiguration with CPC to the UE, including the SCG MeasConfig for CPC from the S-SN as an SCG Reconfiguration, and the execution condition per target candidate cell in the selected subset. receives an RRC Reconfiguration Complete from the UE, including an embedded SN/SCG RRC Reconfiguration Complete (forwarded by the MN to the S-SN). Upon configuring CPC, i.e., upon receiving the complete message from the UE, the MN transmits a message to the S-SN indicating that CPC has been configured for the subset of cells selected by the T-SN (so that the S-SN becomes aware that CPC was not configured for all requested/suggested cells. The message can correspond to an “S-NODE CHANGE CONFIRM” and includes at least the SCG RRC Reconfiguration Complete (received from the UE) and an indication of the subset of selected cells.

Figure 12:
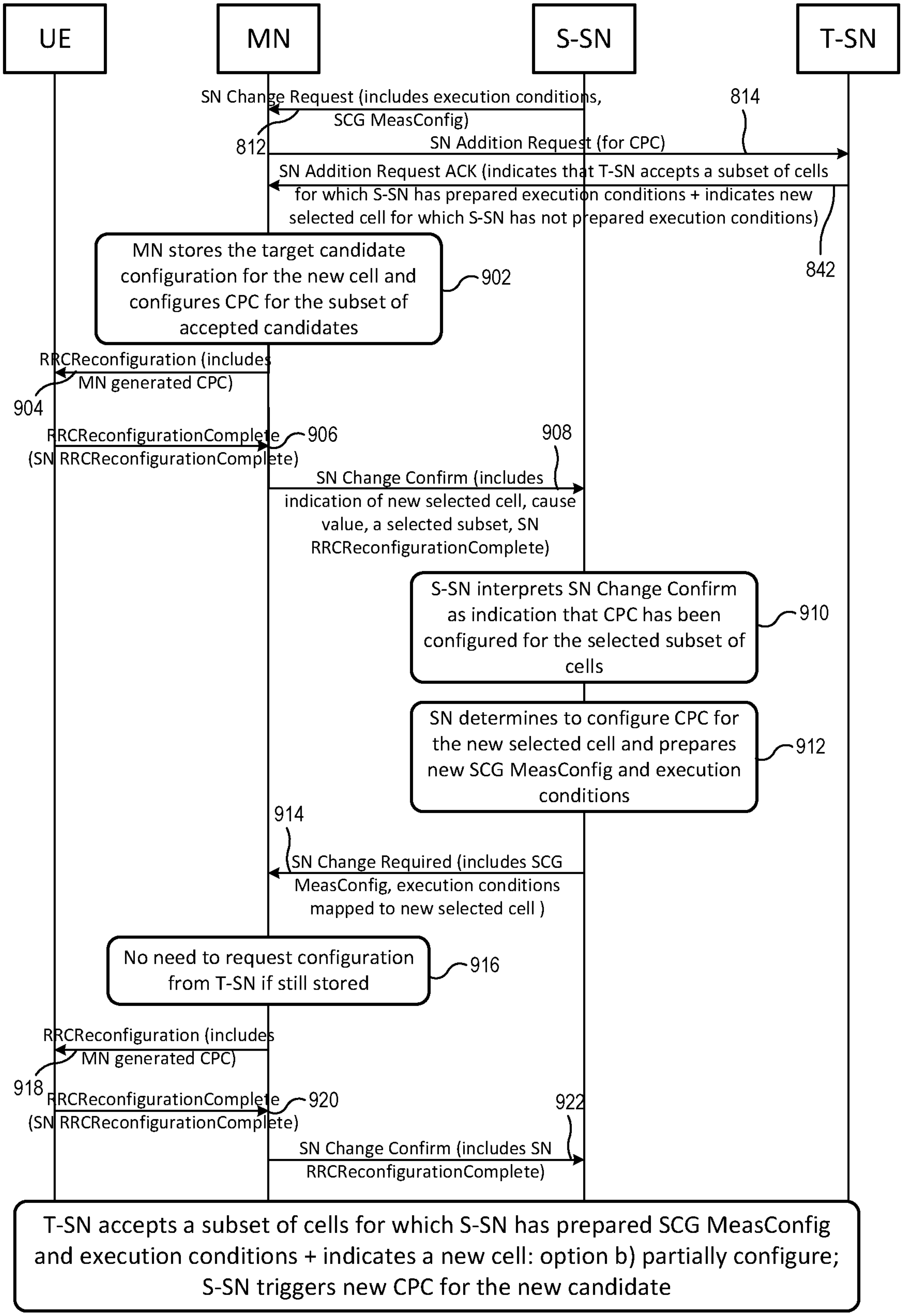

FIG. 12 illustrates an example in which T-SN accepts a subset of cells for which the S-SN has prepared SCG MeasConfig and execution conditions and indicates a new cell. In this example, the S-SN triggers a new CPC for the candidate.

Referring to FIG. 12, the MN receives an SN Change Required message 812 from the S-SN, and in response sends an SN addition request 814 to a T-SN. The SN Addition Request 814 includes measurement conditions (SCG MeasConfig) and execution conditions for one or more cells served by the T-SN that are suggested/requested for CPC. The T-SN responds with a SN Addition Request ACK message 842 that indicates that the T-SN has selected a subset of the suggested/requested cells identified in the SN Addition Request and has selected one or more new cells for which the S-SN has not prepared execution condition(s) or a measurement configuration.

At block 902, the MN stores the target candidate configuration for the new cell and configures CPC at the UE for the subset of requested candidates that was accepted by the T-SN.

The MN then transmits an RRC Reconfiguration with CPC message 904 to the UE, including the SCG MeasConfig for CPC from the S-SN as an SCG Reconfiguration, and the execution condition for the selected subset of requested cells. The MN receives an RRC Reconfiguration Complete message 906 from the UE, including an embedded SN/SCG RRC Reconfiguration Complete.

Upon receiving the RRCReconfigurationComplete message from the UE, the MN transmits a SN Change Confirm message 908 to the S-SN indicating that CPC has been configured for the selected subset of requested cells.

At block 910, the S-SN interprets the SN Change Confirm message as an indication that CPC has been configured for the selected subset of requested cells. At block 912 determines to configure CPC for the new selected cell, and prepares execution conditions and a measurement configuration for the new selected cell. The S-SN then sends an SN Change Required message 914 to the MN.

At block 916, if the target configuration for the new cell is still stored at the MN, the MN determines that there is no need to request the configuration from the T-SN.

The MN then transmits an RRC Reconfiguration with CPC message 918 to the UE, including the SCG MeasConfig for CPC from the S-SN as an SCG Reconfiguration, and the execution condition for the new target candidate cell. The MN receives an RRC Reconfiguration Complete message 920 from the UE, including an embedded SN/SCG RRC Reconfiguration Complete.

Upon receiving the RRCReconfigurationComplete message from the UE, the MN transmits a SN Change Confirm message 922 to the S-SN indicating that CPC has been configured for the new selected cells.

Figure 13:
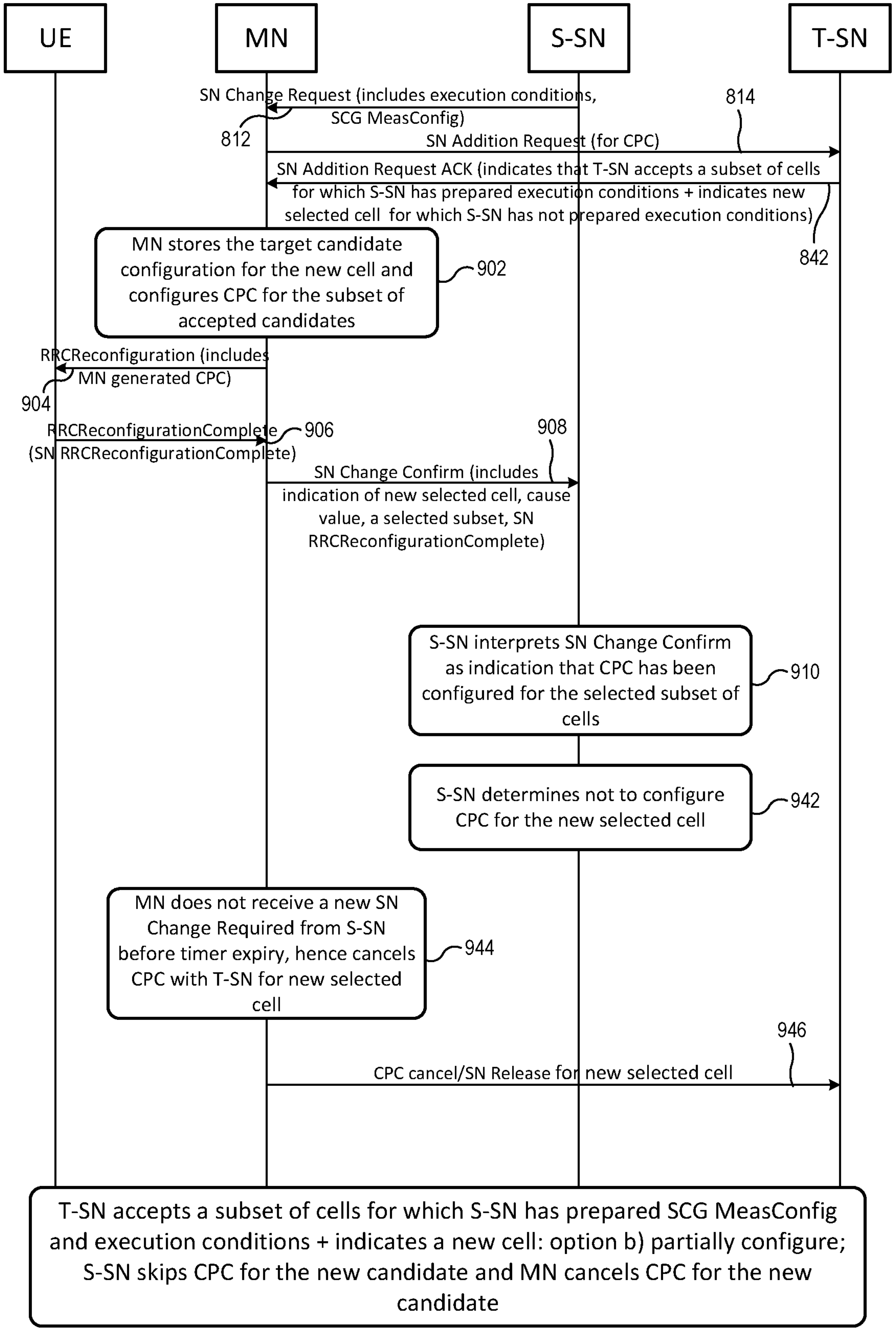

FIG. 13 illustrates an example in which T-SN accepts a subset of cells for which the S-SN has prepared SCG MeasConfig and execution conditions and indicates a new cell with option b) partially configure. In this example, the S-SN skips CPC for the new candidate and the MN cancels CPC for the new candidate.

Referring to FIG. 13, the MN receives an SN Change Required message 812 from the S-SN, and in response sends an SN addition request 814 to a T-SN. The SN Addition Request 814 includes measurement conditions (SCG MeasConfig) and execution conditions for one or more cells served by the T-SN that are suggested/requested for CPC. The T-SN responds with a SN Addition Request ACK message 842 that indicates that the T-SN has selected a subset of the suggested/requested cells identified in the SN Addition Request and has selected one or more new cells for which the S-SN has not prepared execution condition(s) or a measurement configuration.

At block 902, the MN stores the target candidate configuration for the new cell and configures CPC at the UE for the subset of requested candidates that was accepted by the T-SN.

The MN then transmits an RRC Reconfiguration with CPC message 904 to the UE, including the SCG MeasConfig for CPC from the S-SN as an SCG Reconfiguration, and the execution condition for the selected subset of requested cells. The MN receives an RRC Reconfiguration Complete message 906 from the UE, including an embedded SN/SCG RRC Reconfiguration Complete.

Upon receiving the RRCReconfigurationComplete message from the UE, the MN transmits a SN Change Confirm message 908 to the S-SN indicating that CPC has been configured for the selected subset of requested cells.

At block 910, the S-SN interprets the SN Change Confirm message as an indication that CPC has been configured for the selected subset of requested cells.

At block 942, the S-SN determines not to configure CPC for the new selected cell.

At block 944, as the MN does not receive a new SN Change Required message from the S-SN before timer expiry, the MN cancels CPC for the new selected cell by sending a CPC cancel/SN Release message 946 to the T-SN for the new selected cell.

Some embodiments provide a method performed by a second network node operating as a S-SN for a UE configured with MR-DC. In particular, an S-SN transmits a request for CPC. The request may correspond to an S-NODE CHANGE REQUIRED message including an indication this is for a Conditional Reconfiguration e.g. a Conditional PSCell Change (CPC), e.g., as in an SN-initiated CPC.

The request may include at least one execution condition configuration for CPC (e.g. one or two measId(s), possibly in SN format) mapped to at least one target candidate cell in a frequency carrier. That can possibly be included in an inter-node RRC message/container (e.g. CG-Config).

The request may include the SCG MeasConfig including the measurement configuration for CPC i.e. the configuration of the measId(s) referred in the execution conditions and associated measurement object and report configuration.

In some embodiments, the S-SN receives a message from the MN comprising an indication that the T-SN has selected a subset of the suggested/requested cells i.e. cells for which the S-SN has provided the execution conditions and the SCG MeasConfig for CPC, an indication whether the MN has configured the UE or not with CPC for the selected subset of cells, and an indication of the subset of cells selected by the T-SN.

For example, referring to FIG. 12, in one option, the S-SN receives an indication that CPC has been configured for the subset of cells selected by the T-SN (so that the S-SN becomes aware that CPC was not configured for all requested/suggested cells). The message can correspond to an “S-NODE CHANGE CONFIRM” and includes at least the SCG RRC Reconfiguration Complete (received from the UE) and an indication of the subset of selected cells.

Referring to FIG. 11, in another option, the S-SN receives an indication that CPC has NOT been configured at the UE, as not all suggested/requested candidate cell(s) have been accepted by the T-SN. The message can correspond to an SN CHANGE REFUSE, and may include an indication of the subset of selected cells by the T-SN, and possibly a cause value. As the S-SN becomes aware that CPC was not configured at the UE, the S-SN can possibly trigger another SN CHANGE REQUIRED, this time only for the subset that has been accepted by the T-SN, the SCG MeasConfig for CPC and the execution conditions mapped to the subset of selected cells in a new S-NODE CHANGE REQUIRED from the S-SN to the MN.

Referring to FIG. 11, in some embodiments, the S-SN receives an indication from the MN that indicates to the S-SN that the change is refused (by reception of an SN CHANGE REFUSE) and including an indication of the new cell(s) selected by the T-SN.

In one option, the S-SN, upon having received that indication, triggers a new SN CHANGE REQUIRED for CPC for the new cell, by transmitting a new SN CHANGE REQUIRED including an SCG MeasConfig for CPC, and execution conditions mapped to the new cell(s).

Referring to FIG. 10, in another option, the S-SN, upon having received that indication, determines to skip CPC i.e. to abort CPC requests to the MN (at least for some time).

Referring to FIG. 12, in some embodiments, the S-SN receives an indication that the T-SN has selected both new cell(s) i.e. cell(s) that is/are not a cell for which the S-SN has provided the execution conditions and the SCG MeasConfig for CPC, and a subset of cells for which the S-SN has provided the execution conditions and the SCG MeasConfig for CPC. The MN determines whether it configures the UE with the subset of cells, or whether it refuses the whole CPC request from the S-SN.

Referring to FIG. 12, in one option, the S-SN receives the indication that CPC has been configured for the subset of cells selected by the T-SN (so that the S-SN becomes aware that CPC was not configured for all requested/suggested cells). The message can correspond to an "S-NODE CHANGE CONFIRM" and includes at least the SCG RRC Reconfiguration Complete (received from the UE) and an indication of the subset of selected cells. The message also includes the indication that a new cell has been selected by the T-SN, but not configured for CPC (yet).

Still referring to FIG. 12, in one option, the S-SN determines to request CPC to the MN for the new cell(s) selected by the T-SN. the S-SN transmits a new SN CHANGE REQUIRED for the new cell(s) including SCG MeasConfig and execution condition(s) associated to the new cell.

Referring to FIG. 13, in one option, the S-SN determines to skip CPC for the new cell and does not transmit a new SN CHANGE REQUIRED, so that after some time the MN can cancel the CPC configuration for the new cell towards the target candidate cell.

In another option the, the S-SN receives from the MN an indication indicating that CPC has not been configured at the UE. The message can correspond to an SN CHANGE REFUSE, and may include an indication of the subset of selected cells by the T-SN, and possibly a cause value. Thanks to that the S-SN becomes aware that CPC was not configured at the UE.

For example, referring to FIG. 12, in one option, the S-SN triggers another SN CHANGE REQUIRED, this time only for the subset that has been accepted by the T-SN, the SCG MeasConfig for CPC and the execution conditions mapped to the subset of selected cells in a new S-NODE CHANGE REQUIRED from the S-SN to the MN.

Referring to FIG. 11, in another option, the S-SN triggers another SN CHANGE REQUIRED, for the subset that has been accepted by the T-SN and/or the new candidate(s) selected by the T-SN, the SCG MeasConfig for CPC and the execution conditions mapped to the cells in a new S-NODE CHANGE REQUIRED from the S-SN to the MN.

In some embodiments, the S-SN receives a message from a Master Node (MN), the message indicating that some candidate target cell(s) for CPC were accepted by the target SN and some candidate target cell(s) were rejected by the target SN. The message may be an S-NODE CHANGE CONFIRM message or an S-NODE CHANGE REFUSE message.

The accepted target cells may be included in the target SN configuration in CG-ConfigInfo. This may be a list containing only the cells selected by the target SN but not by the source SN.

Alternatively, all selected cells may be included in a list. The rejected target cells may be implicitly indicated by not being part of the target SN configuration in CG-ConfigInfo. Alternatively, the rejected target cells may be included as a (list of) cells.

The message may optionally include a cause value for the rejection.

Alternatively, the S-SN may receive a message from a Master Node (MN indicating the candidate target cell(s) for CPC that were rejected by the target SN.

The message may be an S-NODE CHANGE REFUSE message.

The rejected target cells may be included as a (list of) cells. The message may contain a list of cells selected by the target SN but not the by source SN. Alternatively, the rejected target cells may be implicitly indicated a not being part of the target SN configuration in CG-ConfigInfo.

The message may optionally include a cause value for the rejection. The cause value could, for example, be lack of resources, load distribution reason or other reason.

In some embodiments, the S-SN may transmit a new conditional S-NODE CHANGE REQUEST (or CPC request) to the target SN, including a list of target cells to be configured for CPC, among the cells selected by the target SN, but not configured yet. The request may include a list of additional target cells to be configured, these cells belonging to the T-SN. The message may include executing conditions for these cells.

As an option, multiple S-NODE CHANGE REFUSE messages may be received by a S-SN. In some embodiments, there may be one S-NODE CHANGE REFUSE message per candidate target SN. In some embodiments, there may be one S-NODE CHANGE REFUSE message per candidate target cell.

In some alternatives to the above methods, the MN may determine that the total number of conditional reconfigurations for the UE will exceed a limit, e.g. the limit for maximum number of conditional reconfigurations as defined by maxNrofCondCells-r16, if the new candidate target cell(s) for CPC are added to the UE configuration. In one example, this may be due to that the conditional reconfigurations for the UE consists of both Conditional Handover (CHO) and Conditional PSCell Change (CPC) configurations and/or that the CPC configurations may be initiated both by the source SN and by the MN. In both these cases there are different nodes initiating the configurations.

In one alternative, the MN determines that the limit for total number of conditional reconfigurations is reached when it receives the request for conditional reconfiguration(s) from the (source) SN, such as an S-NODE CHANGE REQUIRED message for an SN initiated inter-SN CPC. The MN then sends back a message to the (source) SN, e.g. an S-NODE CHANGE REFUSE message, to indicate that the request is not accepted. In one example, an indication that the limit for number of conditional reconfigurations is reached (or exceeded) is included by the MN in the S-NODE CHANGE REFUSE message, or provided within a container that is included in that message.

In one alternative the Master Node (MN) determines that the limit for number of conditional reconfigurations for the UE will be exceeded after receiving the response from the target Secondary Node (SN) with the list of candidate target cell(s) for CPC that the target SN has selected. When the MN has determined that the total number of conditional reconfigurations for the UE will exceed a limit (if the candidate target cell(s) for CPC that have been selected by the target SN are added to the UE configuration), the MN then determines to reject (or remove) one or more of the selected candidate target cell(s) so that they are not included in the UE configuration. The MN then includes the information about the candidate target cell(s) (PSCell(s)) that have been rejected (or removed) due to that the limit of number of conditional reconfigurations have been reached or exceeded in a message that is sent to the source SN. The information can, for example, be included in an S-NODE CHANGE REFUSE or an S-NODE CHANGE CONFIRM message. In one example, the MN includes a list of candidate target cell(s) that have been rejected/removed in the message to the source SN together with an indication that they were not accepted due to that the limit of number of conditional reconfigurations has been reached or exceeded. In another example, the MN only includes information that one or more candidate target cell(s) provided by the source SN have been rejected due to that the limit for number of conditional reconfigurations has been reached/exceeded. In one example the MN also includes information (in the message to the source SN) that one or more candidate target cell(s) selected by the target SN have been removed by the MN due to that the limit for number of conditional reconfigurations for the UE has been reached/exceeded.

In one alternative, the MN provides information to the (source) SN about the number of conditional reconfigurations that the UE can still be configured with. Based on this information the source SN can then determine whether it may be possible to configure the UE with further conditional reconfigurations for CPC.

Figure 16:
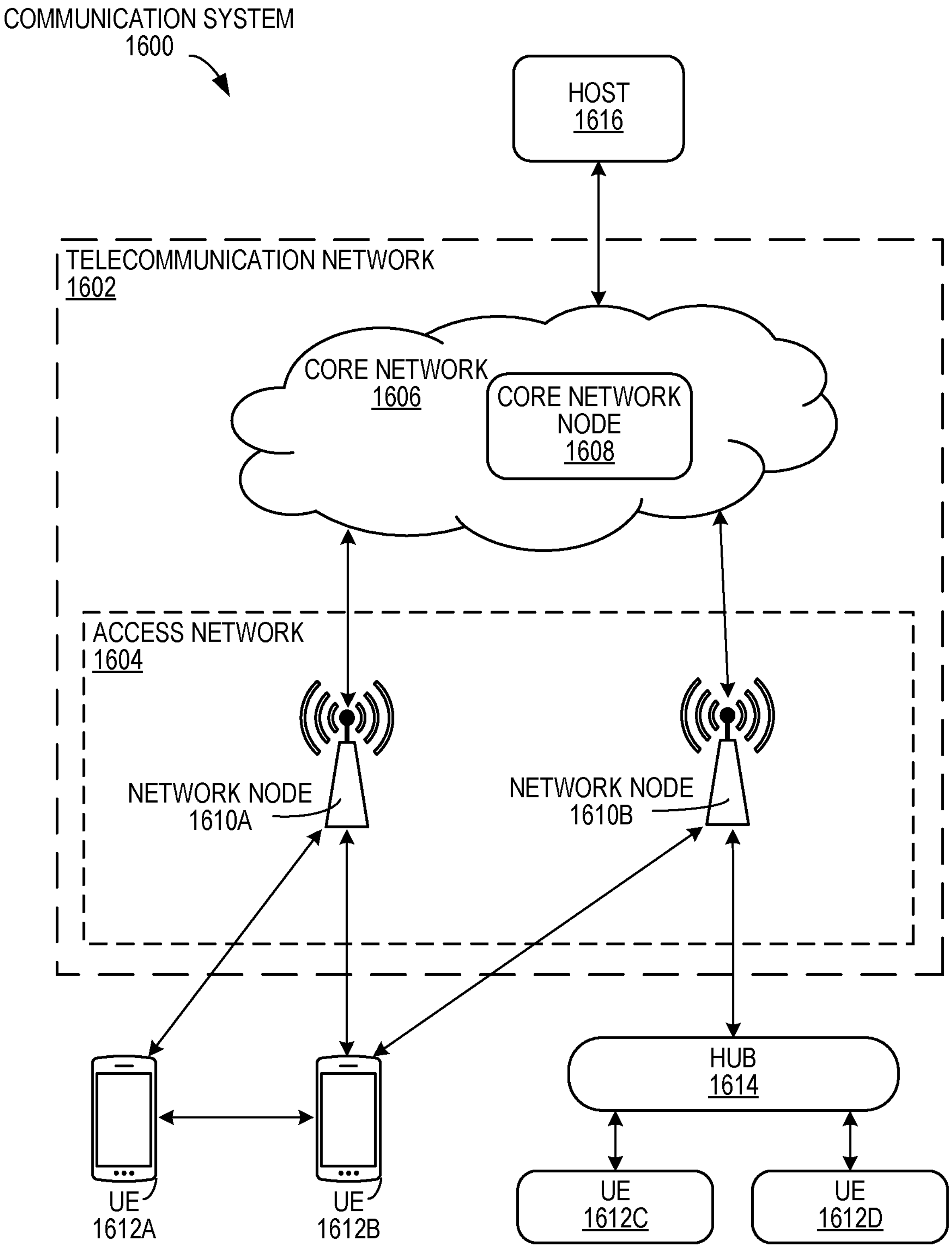
FIG. 16 illustrates an example of a communication system in accordance with some embodiments.

FIG. 16 shows an example of a communication system 1600 in accordance with some embodiments.

In the example, the communication system 1600 includes a telecommunication network 1602 that includes an access network 1604, such as a radio access network (RAN), and a core network 1606, which includes one or more core network nodes 1608. The access network 1604 includes one or more access network nodes, such as network nodes 1610*a* and 1610*b* (one or more of which may be generally referred to as network nodes 1610), or any other similar 3$^{rd}$ Generation Partnership Project (3GPP) access node or non-3GPP access point. The network nodes 1610 facilitate direct or indirect connection of user equipment (UE), such as by connecting UEs 1612*a*, 1612*b*, 1612*c*, and 1612*d* (one or more of which may be generally referred to as UEs 1612) to the core network 1606 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1600 may include any number of wired or wireless networks, network nodes, UEs, and/or any other components or systems that may facilitate or participate in the communication of data and/or signals whether via wired or wireless connections. The communication system 1600 may include and/or interface with any type of communication, telecommunication, data, cellular, radio network, and/or other similar type of system.

The UEs 1612 may be any of a wide variety of communication devices, including wireless devices arranged, configured, and/or operable to communicate wirelessly with the network nodes 1610 and other communication devices. Similarly, the network nodes 1610 are arranged, capable, configured, and/or operable to communicate directly or indirectly with the UEs 1612 and/or with other network nodes or equipment in the telecommunication network 1602 to enable and/or provide network access, such as wireless network access, and/or to perform other functions, such as administration in the telecommunication network 1602.

In the depicted example, the core network 1606 connects the network nodes 1610 to one or more hosts, such as host 1616. These connections may be direct or indirect via one or more intermediary networks or devices. In other examples, network nodes may be directly coupled to hosts. The core network 1606 includes one more core network nodes (e.g., core network node 1608) that are structured with hardware and software components. Features of these components may be substantially similar to those described with respect to the UEs, network nodes, and/or hosts, such that the descriptions thereof are generally applicable to the corresponding components of the core network node 1608. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1616 may be under the ownership or control of a service provider other than an operator or provider of the access network 1604 and/or the telecommunication network 1602, and may be operated by the service provider or on behalf of the service provider. The host 1616 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1600 of FIG. 16 enables connectivity between the UEs, network nodes, and hosts. In that sense, the communication system may be configured to operate according to predefined rules or procedures, such as specific standards that include, but are not limited to: Global System for Mobile Communications (GSM), Universal Mobile Telecommunications System (UMTS), Long Term Evolution (LTE), and/or other suitable 2G, 3G, 4G, 5G standards, or any applicable future generation standard (e.g., 6G), wireless local area network (WLAN) standards, such as the Institute of Electrical and Electronics Engineers (IEEE) 802.11 standards (WiFi), and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1602 is a cellular network that implements 3GPP standardized features. Accordingly, the telecommunications network 1602 may support network slicing to provide different logical networks to different devices that are connected to the telecommunication network 1602. For example, the telecommunications network 1602 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1612 are configured to transmit and/or receive information without direct human interaction. For instance, a UE may be designed to transmit information to the access network 1604 on a predetermined schedule, when triggered by an internal or external event, or in response to requests from the access network 1604. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1614 communicates with the access network 1604 to facilitate indirect communication between one or more UEs (e.g., UE 1612*c* and/or 1612*d*) and network nodes (e.g., network node 1610*b*). In some examples, the hub 1614 may be a controller, router, content source and analytics, or any of the other communication devices described herein regarding UEs. For example, the hub 1614 may be a broadband router enabling access to the core network 1606 for the UEs. As another example, the hub 1614 may be a controller that sends commands or instructions to one or more actuators in the UEs. Commands or instructions may be received from the UEs, network nodes 1610, or by executable code, script, process, or other instructions in the hub 1614. As another example, the hub 1614 may be a data collector that acts as temporary storage for UE data and, in some embodiments, may perform analysis or other processing of the data. As another example, the hub 1614 may be a content source. For example, for a UE that is a VR headset, display, loudspeaker or other media delivery device, the hub 1614 may retrieve VR assets, video, audio, or other media or data related to sensory information via a network node, which the hub 1614 then provides to the UE either directly, after performing local processing, and/or after adding additional local content. In still another example, the hub 1614 acts as a proxy server or orchestrator for the UEs, in particular in if one or more of the UEs are low energy IoT devices.

The hub 1614 may have a constant/persistent or intermittent connection to the network node 1610*b*. The hub 1614 may also allow for a different communication scheme and/or schedule between the hub 1614 and UEs (e.g., UE 1612*c* and/or 1612*d*), and between the hub 1614 and the core network 1606. In other examples, the hub 1614 is connected to the core network 1606 and/or one or more UEs via a wired connection. Moreover, the hub 1614 may be configured to connect to an M2M service provider over the access network 1604 and/or to another UE over a direct connection. In some scenarios, UEs may establish a wireless connection with the network nodes 1610 while still connected via the hub 1614 via a wired or wireless connection. In some embodiments, the hub 1614 may be a dedicated hub—that is, a hub whose primary function is to route communications to/from the UEs from/to the network node 1610*b*. In other embodiments, the hub 1614 may be a non-dedicated hub—that is, a device which is capable of operating to route communications between the UEs and network node 1610*b*, but which is additionally capable of operating as a communication start and/or end point for certain data channels.

Figure 17:
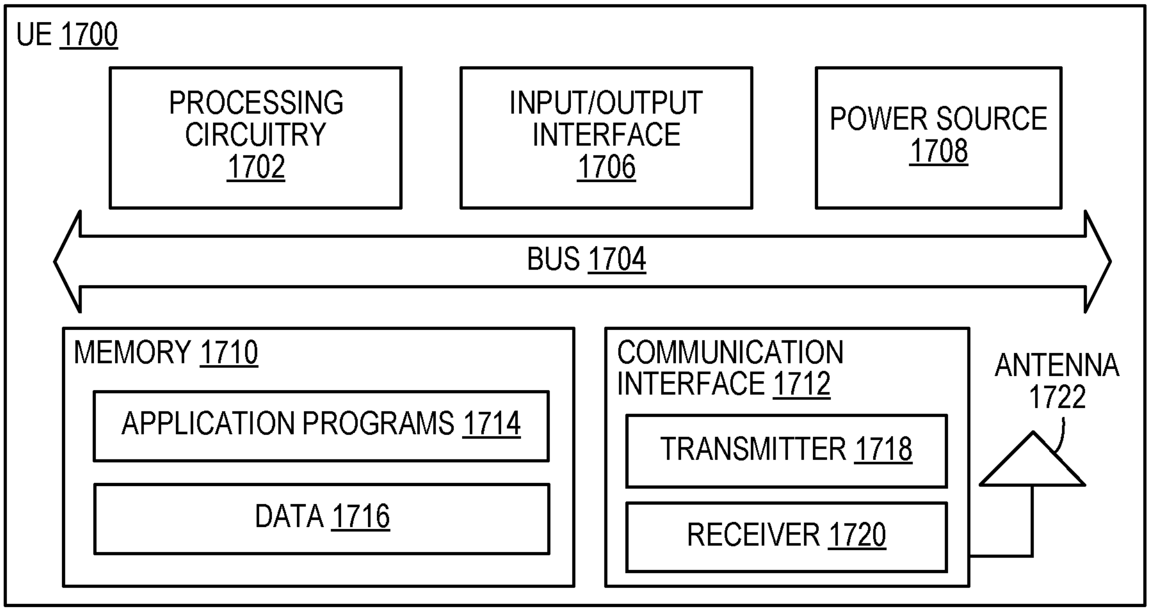
FIG. 17 illustrates an example of a UE in accordance with some embodiments.

FIG. 17 shows a UE 1700 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1700 includes processing circuitry 1702 that is operatively coupled via a bus 1704 to an input/output interface 1706, a power source 1708, a memory 1710, a communication interface 1712, and/or any other component, or any combination thereof. Certain UEs may utilize all or a subset of the components shown in FIG. 17. The level of integration between the components may vary from one UE to another UE. Further, certain UEs may contain multiple instances of a component, such as multiple processors, memories, transceivers, transmitters, receivers, etc.

The processing circuitry 1702 is configured to process instructions and data and may be configured to implement any sequential state machine operative to execute instructions stored as machine-readable computer programs in the memory 1710. The processing circuitry 1702 may be implemented as one or more hardware-implemented state machines (e.g., in discrete logic, field-programmable gate arrays (FPGAs), application specific integrated circuits (ASICs), etc.), programmable logic together with appropriate firmware, one or more stored computer programs, general-purpose processors, such as a microprocessor or digital signal processor (DSP), together with appropriate software, or any combination of the above. For example, the processing circuitry 1702 may include multiple central processing units (CPUs).

In the example, the input/output interface 1706 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1700. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1708 is structured as a battery or battery pack. Other types of power sources, such as an external power source (e.g., an electricity outlet), photovoltaic device, or power cell, may be used. The power source 1708 may further include power circuitry for delivering power from the power source 1708 itself, and/or an external power source, to the various parts of the UE 1700 via input circuitry or an interface such as an electrical power cable. Delivering power may be, for example, for charging of the power source 1708. Power circuitry may perform any formatting, converting, or other modification to the power from the power source 1708 to make the power suitable for the respective components of the UE 1700 to which power is supplied.

The memory 1710 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1710 includes one or more application programs 1714, such as an operating system, web browser application, a widget, gadget engine, or other application, and corresponding data 1716. The memory 1710 may store, for use by the UE 1700, any of a variety of various operating systems or combinations of operating systems.

The memory 1710 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1710 may allow the UE 1700 to access instructions, application programs and the like, stored on transitory or non-transitory memory media, to off-load data, or to upload data. An article of manufacture, such as one utilizing a communication system may be tangibly embodied as or in the memory 1710, which may be or comprise a device-readable storage medium.

The processing circuitry 1702 may be configured to communicate with an access network or other network using the communication interface 1712. The communication interface 1712 may comprise one or more communication subsystems and may include or be communicatively coupled to an antenna 1722. The communication interface 1712 may include one or more transceivers used to communicate, such as by communicating with one or more remote transceivers of another device capable of wireless communication (e.g., another UE or a network node in an access network). Each transceiver may include a transmitter 1718 and/or a receiver 1720 appropriate to provide network communications (e.g., optical, electrical, frequency allocations, and so forth). Moreover, the transmitter 1718 and receiver 1720 may be coupled to one or more antennas (e.g., antenna 1722) and may share circuit components, software or firmware, or alternatively be implemented separately.

In the illustrated embodiment, communication functions of the communication interface 1712 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1712, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1700 shown in FIG. 17.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 18:
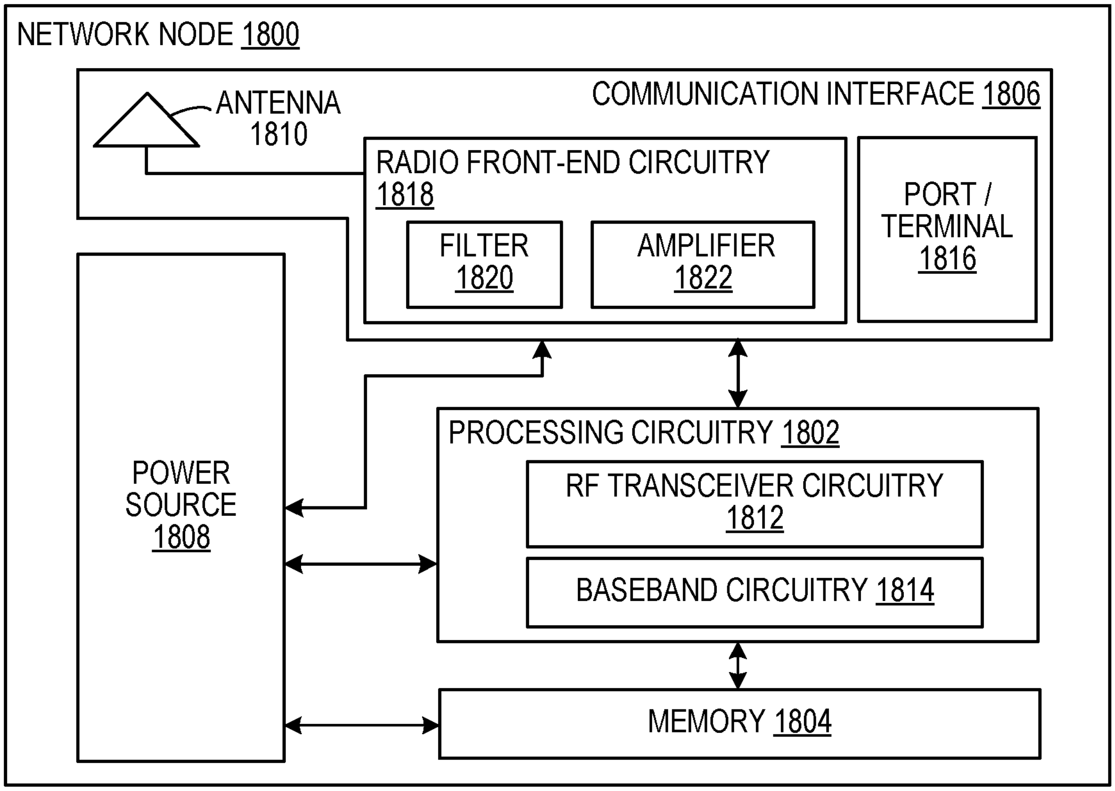
FIG. 18 illustrates an example of a network node in accordance with some embodiments.

FIG. 18 shows a network node 1800 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1800 includes a processing circuitry 1802, a memory 1804, a communication interface 1806, and a power source 1808. The network node 1800 may be composed of multiple physically separate components (e.g., a NodeB component and a RNC component, or a BTS component and a BSC component, etc.), which may each have their own respective components. In certain scenarios in which the network node 1800 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1800 may be configured to support multiple radio access technologies (RATs). In such embodiments, some components may be duplicated (e.g., separate memory 1804 for different RATs) and some components may be reused (e.g., a same antenna 1810 may be shared by different RATs). The network node 1800 may also include multiple sets of the various illustrated components for different wireless technologies integrated into network node 1800, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1800.

The processing circuitry 1802 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1800 components, such as the memory 1804, to provide network node 1800 functionality.

In some embodiments, the processing circuitry 1802 includes a system on a chip (SOC). In some embodiments, the processing circuitry 1802 includes one or more of radio frequency (RF) transceiver circuitry 1812 and baseband processing circuitry 1814. In some embodiments, the radio frequency (RF) transceiver circuitry 1812 and the baseband processing circuitry 1814 may be on separate chips (or sets of chips), boards, or units, such as radio units and digital units. In alternative embodiments, part or all of RF transceiver circuitry 1812 and baseband processing circuitry 1814 may be on the same chip or set of chips, boards, or units.

The memory 1804 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1802. The memory 1804 may store any suitable instructions, data, or information, including a computer program, software, an application including one or more of logic, rules, code, tables, and/or other instructions capable of being executed by the processing circuitry 1802 and utilized by the network node 1800. The memory 1804 may be used to store any calculations made by the processing circuitry 1802 and/or any data received via the communication interface 1806. In some embodiments, the processing circuitry 1802 and memory 1804 is integrated.

The communication interface 1806 is used in wired or wireless communication of signaling and/or data between a network node, access network, and/or UE. As illustrated, the communication interface 1806 comprises port(s)/terminal(s) 1816 to send and receive data, for example to and from a network over a wired connection. The communication interface 1806 also includes radio front-end circuitry 1818 that may be coupled to, or in certain embodiments a part of, the antenna 1810. Radio front-end circuitry 1818 comprises filters 1820 and amplifiers 1822. The radio front-end circuitry 1818 may be connected to an antenna 1810 and processing circuitry 1802. The radio front-end circuitry may be configured to condition signals communicated between antenna 1810 and processing circuitry 1802. The radio front-end circuitry 1818 may receive digital data that is to be sent out to other network nodes or UEs via a wireless connection. The radio front-end circuitry 1818 may convert the digital data into a radio signal having the appropriate channel and bandwidth parameters using a combination of filters 1820 and/or amplifiers 1822. The radio signal may then be transmitted via the antenna 1810. Similarly, when receiving data, the antenna 1810 may collect radio signals which are then converted into digital data by the radio front-end circuitry 1818. The digital data may be passed to the processing circuitry 1802. In other embodiments, the communication interface may comprise different components and/or different combinations of components.

In certain alternative embodiments, the network node 1800 does not include separate radio front-end circuitry 1818, instead, the processing circuitry 1802 includes radio front-end circuitry and is connected to the antenna 1810. Similarly, in some embodiments, all or some of the RF transceiver circuitry 1812 is part of the communication interface 1806. In still other embodiments, the communication interface 1806 includes one or more ports or terminals 1816, the radio front-end circuitry 1818, and the RF transceiver circuitry 1812, as part of a radio unit (not shown), and the communication interface 1806 communicates with the baseband processing circuitry 1814, which is part of a digital unit (not shown).

The antenna 1810 may include one or more antennas, or antenna arrays, configured to send and/or receive wireless signals. The antenna 1810 may be coupled to the radio front-end circuitry 1818 and may be any type of antenna capable of transmitting and receiving data and/or signals wirelessly. In certain embodiments, the antenna 1810 is separate from the network node 1800 and connectable to the network node 1800 through an interface or port.

The antenna 1810, communication interface 1806, and/or the processing circuitry 1802 may be configured to perform any receiving operations and/or certain obtaining operations described herein as being performed by the network node. Any information, data and/or signals may be received from a UE, another network node and/or any other network equipment. Similarly, the antenna 1810, the communication interface 1806, and/or the processing circuitry 1802 may be configured to perform any transmitting operations described herein as being performed by the network node. Any information, data and/or signals may be transmitted to a UE, another network node and/or any other network equipment.

The power source 1808 provides power to the various components of network node 1800 in a form suitable for the respective components (e.g., at a voltage and current level needed for each respective component). The power source 1808 may further comprise, or be coupled to, power management circuitry to supply the components of the network node 1800 with power for performing the functionality described herein. For example, the network node 1800 may be connectable to an external power source (e.g., the power grid, an electricity outlet) via an input circuitry or interface such as an electrical cable, whereby the external power source supplies power to power circuitry of the power source 1808. As a further example, the power source 1808 may comprise a source of power in the form of a battery or battery pack which is connected to, or integrated in, power circuitry. The battery may provide backup power should the external power source fail.

Embodiments of the network node 1800 may include additional components beyond those shown in FIG. 18 for providing certain aspects of the network node's functionality, including any of the functionality described herein and/or any functionality necessary to support the subject matter described herein. For example, the network node 1800 may include user interface equipment to allow input of information into the network node 1800 and to allow output of information from the network node 1800. This may allow a user to perform diagnostic, maintenance, repair, and other administrative functions for the network node 1800.

Figure 19:
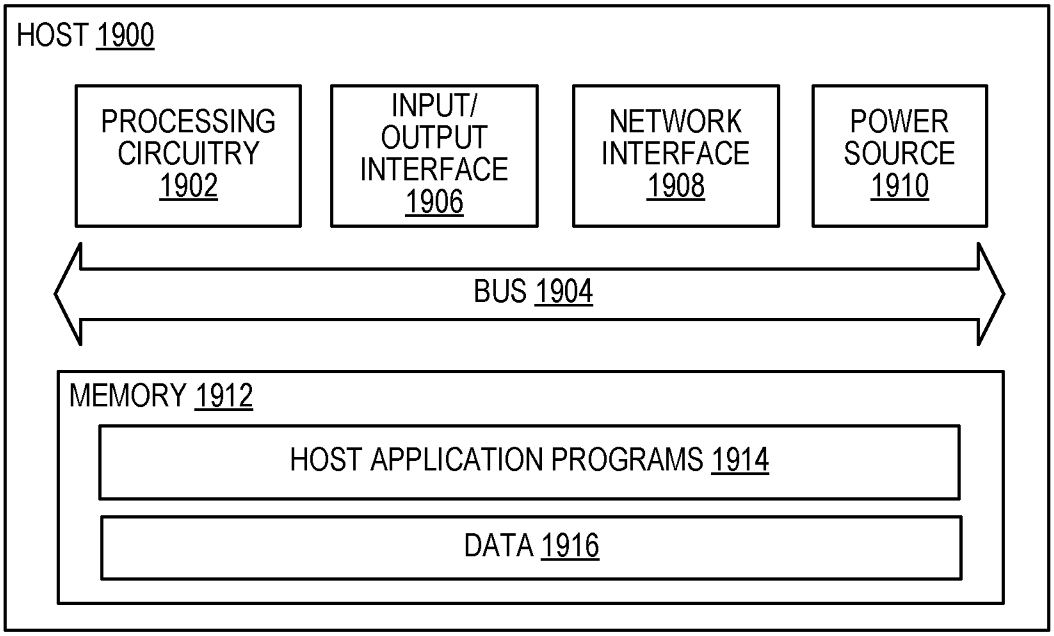
FIG. 19 illustrates an example of a host in accordance with some embodiments.

FIG. 19 is a block diagram of a host 1900, which may be an embodiment of the host 1616 of FIG. 16, in accordance with various aspects described herein. As used herein, the host 1900 may be or comprise various combinations hardware and/or software, including a standalone server, a blade server, a cloud-implemented server, a distributed server, a virtual machine, container, or processing resources in a server farm. The host 1900 may provide one or more services to one or more UEs.

The host 1900 includes processing circuitry 1902 that is operatively coupled via a bus 1904 to an input/output interface 1906, a network interface 1908, a power source 1910, and a memory 1912. Other components may be included in other embodiments. Features of these components may be substantially similar to those described with respect to the devices of previous figures, such as FIGS. 17 and 18, such that the descriptions thereof are generally applicable to the corresponding components of host 1900.

The memory 1912 may include one or more computer programs including one or more host application programs 1914 and data 1916, which may include user data, e.g., data generated by a UE for the host 1900 or data generated by the host 1900 for a UE. Embodiments of the host 1900 may utilize only a subset or all of the components shown. The host application programs 1914 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1914 may also provide for user authentication and licensing checks and may periodically report health, routes, and content availability to a central node, such as a device in or on the edge of a core network. Accordingly, the host 1900 may select and/or indicate a different host for over-the-top services for a UE. The host application programs 1914 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 20:
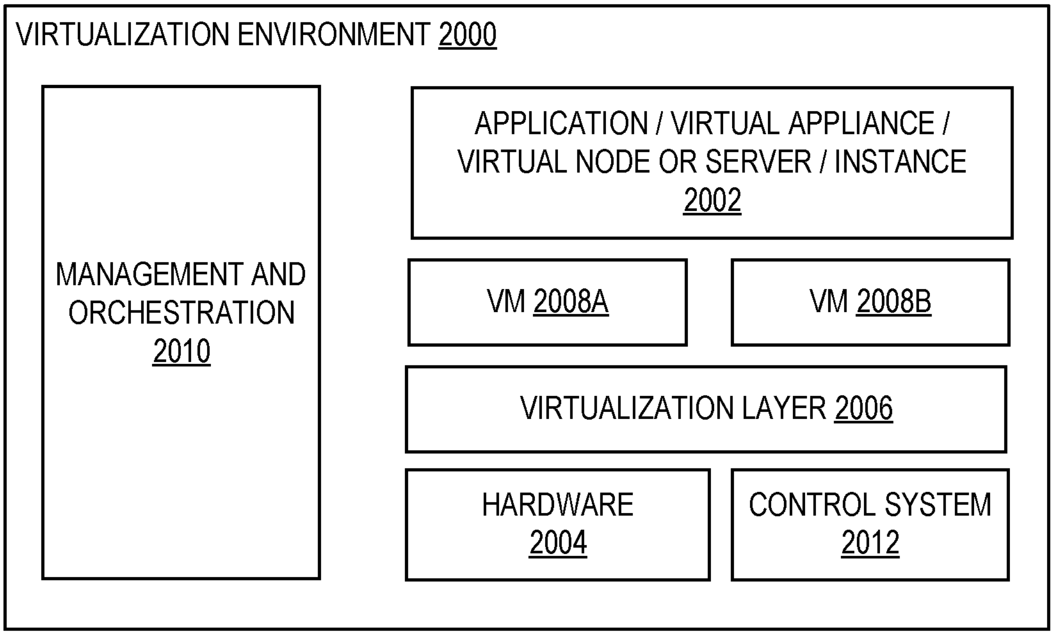
FIG. 20 is a block diagram illustrating a virtualization environment in which functions implemented by some embodiments may be virtualized.

FIG. 20 is a block diagram illustrating a virtualization environment 2000 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 2000 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 2002 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 2004 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 2006 (also referred to as hypervisors or virtual machine monitors (VMMs)), provide VMs 2008*a* and 2008*b* (one or more of which may be generally referred to as VMs 2008), and/or perform any of the functions, features and/or benefits described in relation with some embodiments described herein. The virtualization layer 2006 may present a virtual operating platform that appears like networking hardware to the VMs 2008.

The VMs 2008 comprise virtual processing, virtual memory, virtual networking or interface and virtual storage, and may be run by a corresponding virtualization layer 2006. Different embodiments of the instance of a virtual appliance 2002 may be implemented on one or more of VMs 2008, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 2008 may be a software implementation of a physical machine that runs programs as if they were executing on a physical, non-virtualized machine. Each of the VMs 2008, and that part of hardware 2004 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 2008 on top of the hardware 2004 and corresponds to the application 2002.

Hardware 2004 may be implemented in a standalone network node with generic or specific components. Hardware 2004 may implement some functions via virtualization. Alternatively, hardware 2004 may be part of a larger cluster of hardware (e.g. such as in a data center or CPE) where many hardware nodes work together and are managed via management and orchestration 2010, which, among others, oversees lifecycle management of applications 2002. In some embodiments, hardware 2004 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 2012 which may alternatively be used for communication between hardware nodes and radio units.

Figure 21:
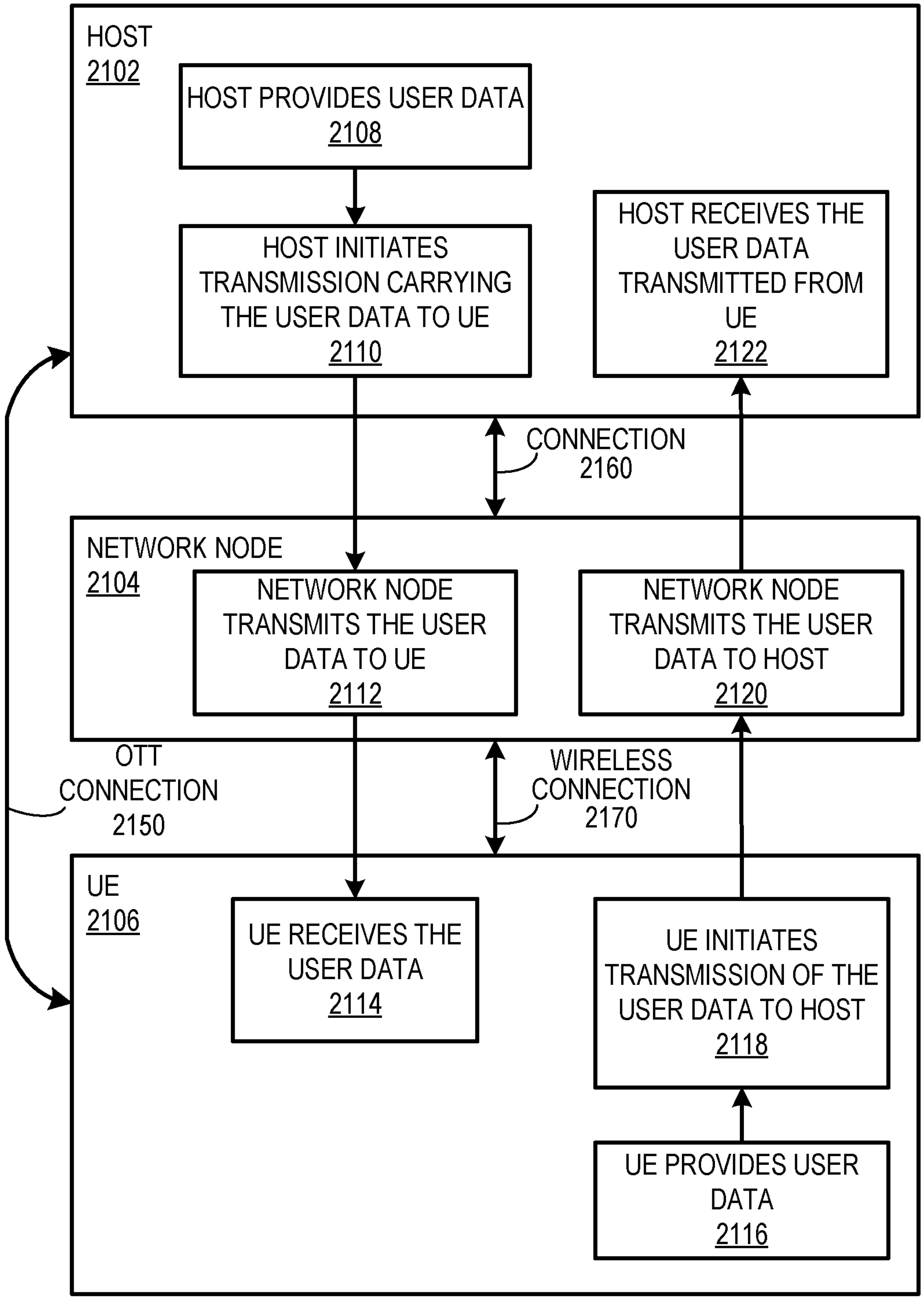
FIG. 21 shows a communication diagram of a host communicating via a network node with a UE over a partially wireless connection in accordance with some embodiments.

FIG. 21 shows a communication diagram of a host 2102 communicating via a network node 2104 with a UE 2106 over a partially wireless connection in accordance with some embodiments. Example implementations, in accordance with various embodiments, of the UE (such as a UE 1612*a* of FIG. 16 and/or UE 1700 of FIG. 17), network node (such as network node 1610*a* of FIG. 16 and/or network node 1800 of FIG. 18), and host (such as host 1616 of FIG. 16 and/or host 1900 of FIG. 19) discussed in the preceding paragraphs will now be described with reference to FIG. 21.

Like host 1900, embodiments of host 2102 include hardware, such as a communication interface, processing circuitry, and memory. The host 2102 also includes software, which is stored in or accessible by the host 2102 and executable by the processing circuitry. The software includes a host application that may be operable to provide a service to a remote user, such as the UE 2106 connecting via an over-the-top (OTT) connection 2150 extending between the UE 2106 and host 2102. In providing the service to the remote user, a host application may provide user data which is transmitted using the OTT connection 2150.

The network node 2104 includes hardware enabling it to communicate with the host 2102 and UE 2106. The connection 2160 may be direct or pass through a core network (like core network 1606 of FIG. 16) and/or one or more other intermediate networks, such as one or more public, private, or hosted networks. For example, an intermediate network may be a backbone network or the Internet.

The UE 2106 includes hardware and software, which is stored in or accessible by UE 2106 and executable by the UE's processing circuitry. The software includes a client application, such as a web browser or operator-specific "app" that may be operable to provide a service to a human or non-human user via UE 2106 with the support of the host 2102. In the host 2102, an executing host application may communicate with the executing client application via the OTT connection 2150 terminating at the UE 2106 and host 2102. In providing the service to the user, the UE's client application may receive request data from the host's host application and provide user data in response to the request data. The OTT connection 2150 may transfer both the request data and the user data. The UE's client application may interact with the user to generate the user data that it provides to the host application through the OTT connection 2150.

The OTT connection 2150 may extend via a connection 2160 between the host 2102 and the network node 2104 and via a wireless connection 2170 between the network node 2104 and the UE 2106 to provide the connection between the host 2102 and the UE 2106. The connection 2160 and wireless connection 2170, over which the OTT connection 2150 may be provided, have been drawn abstractly to illustrate the communication between the host 2102 and the UE 2106 via the network node 2104, without explicit reference to any intermediary devices and the precise routing of messages via these devices.

As an example of transmitting data via the OTT connection 2150, in step 2108, the host 2102 provides user data, which may be performed by executing a host application. In some embodiments, the user data is associated with a particular human user interacting with the UE 2106. In other embodiments, the user data is associated with a UE 2106 that shares data with the host 2102 without explicit human interaction. In step 2110, the host 2102 initiates a transmission carrying the user data towards the UE 2106. The host 2102 may initiate the transmission responsive to a request transmitted by the UE 2106. The request may be caused by human interaction with the UE 2106 or by operation of the client application executing on the UE 2106. The transmission may pass via the network node 2104, in accordance with the teachings of the embodiments described throughout this disclosure. Accordingly, in step 2112, the network node 2104 transmits to the UE 2106 the user data that was carried in the transmission that the host 2102 initiated, in accordance with the teachings of the embodiments described throughout this disclosure. In step 2114, the UE 2106 receives the user data carried in the transmission, which may be performed by a client application executed on the UE 2106 associated with the host application executed by the host 2102.

In some examples, the UE 2106 executes a client application which provides user data to the host 2102. The user data may be provided in reaction or response to the data received from the host 2102. Accordingly, in step 2116, the UE 2106 may provide user data, which may be performed by executing the client application. In providing the user data, the client application may further consider user input received from the user via an input/output interface of the UE 2106. Regardless of the specific manner in which the user data was provided, the UE 2106 initiates, in step 2118, transmission of the user data towards the host 2102 via the network node 2104. In step 2120, in accordance with the teachings of the embodiments described throughout this disclosure, the network node 2104 receives user data from the UE 2106 and initiates transmission of the received user data towards the host 2102. In step 2122, the host 2102 receives the user data carried in the transmission initiated by the UE 2106.

One or more of the various embodiments improve the performance of OTT services provided to the UE 2106 using the OTT connection 2150, in which the wireless connection 2170 forms the last segment. More precisely, the teachings of these embodiments may improve the performance of a system that implements IAB. Since higher layer reconfiguration is a relatively slow process, some embodiments allow for faster and more efficient reconfiguration and hence, increased network flexibility and performance and thereby provide benefits such as reduction in user waiting time, better responsiveness and/or extended battery lifetime.

In an example scenario, factory status information may be collected and analyzed by the host 2102. As another example, the host 2102 may process audio and video data which may have been retrieved from a UE for use in creating maps. As another example, the host 2102 may collect and analyze real-time data to assist in controlling vehicle congestion (e.g., controlling traffic lights). As another example, the host 2102 may store surveillance video uploaded by a UE. As another example, the host 2102 may store or control access to media content such as video, audio, VR or AR which it can broadcast, multicast or unicast to UEs. As other examples, the host 2102 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2150 between the host 2102 and UE 2106, in response to variations in the measurement results. The measurement procedure and/or the network functionality for reconfiguring the OTT connection may be implemented in software and hardware of the host 2102 and/or UE 2106. In some embodiments, sensors (not shown) may be deployed in or in association with other devices through which the OTT connection 2150 passes, the sensors may participate in the measurement procedure by supplying values of the monitored quantities exemplified above, or supplying values of other physical quantities from which software may compute or estimate the monitored quantities. The reconfiguring of the OTT connection 2150 may include message format, retransmission settings, preferred routing etc., the reconfiguring need not directly alter the operation of the network node 2104. Such procedures and functionalities may be known and practiced in the art. In certain embodiments, measurements may involve proprietary UE signaling that facilitates measurements of throughput, propagation times, latency and the like, by the host 2102. The measurements may be implemented in that software causes messages to be transmitted, in particular empty or 'dummy' messages, using the OTT connection 2150 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

ABBREVIATIONS

5GC 5G core network
ACK Acknowledgement
AGC Automatic Gain Control
AMF Access and Mobility management Function AP Application Protocol
BSR Buffer Status Report
BWP Bandwidth Part
C-RNTI Cell Radio Network Temporary Identifier
CA Carrier Aggregation
CE Control Element
CHO Conditional Handover
CN Core Network
CPA Conditional PSCell Addition
CPC Conditional PSCell Change
CP Control Plane
CQI Channel Quality Indicator
C-RNTI Cell Radio Network Temporary Identifier
CSI Channel State Information
DC Dual Connectivity
DCI Downlink Control Information
DL Downlink
DRB Data Radio Bearer
eNB (EUTRAN) base station
E-RAB EUTRAN Radio Access Bearer
E-UTRA Evolved Universal Terrestrial Radio Access
E-UTRAN Evolved Universal Terrestrial Radio Access Network
FDD Frequency Division Duplex
gNB NR base station
GTP-U GPRS Tunneling Protocol-User Plane
IE Information Element
IP Internet Protocol
LTE Long Term Evolution
MCG Master Cell Group
MAC Medium Access Control
MAC CE MAC Control Element
MeNB Master eNB
MgNB Master gNB
MN Master Node
MR-DC Multi-Radio Dual Connectivity
NACK Negative Acknowledgement
NAS Non Access Stratum
NG-RAN Next Generation Radio Access Network
Ng-eNB Next Generation Evolved Node B
NR New Radio
PDCP Packet Data Convergence Protocol
PCell Primary Cell
PCI Physical Cell Identity
PDCCH Physical Downlink Control Channel
PHR Power headroom report
PSCell Primary Secondary Cell (in LTE) or Primary SCG Cell (in NR)
PUCCH Physical Uplink Control Channel
PUSCH Physical Uplink Shared Channel
RACH Random Access Channel
RAT Radio Access Technology
RB Radio Bearer
RLC Radio Link Control
RLF Radio Link Failure
RRC Radio Resource Control
SCell Secondary Cell
SCG Secondary Cell Group
SCTP Stream Control Transmission Protocol
SeNB Secondary eNB
SgNB Secondary gNB
SINR Signal to Interference plus Noise Ratio
SN Secondary Node
SR Scheduling Request
SRB Signaling Radio Bearer
S-SN Source Secondary Node
SUL Supplementary uplink SpCell Special Cell, the primary cell of a master or secondary cell group
TAT Time Alignment Timer
TDD Time Division Duplex
TEID Tunnel Endpoint IDentifier
TNL Transport Network Layer
T-SN Target Secondary Node
UCI Uplink Control Information
UDP User Datagram Protocol
UPF User Plane Function
UE User Equipment
UL Uplink
UL-SCH Uplink Shared Channel
UP User Plane
URLLC Ultra Reliable Low Latency Communication
X2 Interface between base stations

REFERENCES

[1] 3GPP TS 38.331 v16.4.1
[2] 3GPP TS 38.423 v16.5.0

The invention claimed is:

1. A method performed by a first network node operating as a Master Node, MN, for a user equipment, UE, configured with Multi-Radio Dual Connectivity, the method comprising:

receiving a first request for conditional PSCell change, CPC, for the UE from a source secondary node, S-SN, the first request indicating a plurality of candidate cells for PSCell configuration, transmitting a second request for CPC to a candidate target secondary node, T-SN, the second request indicating one or more candidate cells of the plurality of candidate cells for PSCell configuration that are served by the T-SN, receiving a response from the T-SN including an indication that a subset of the one or more candidate cells were accepted by the T-SN and/or an indication identifying a new candidate cell for CPC for the UE, wherein the new candidate cell is not one of the one or more candidate cells, and determining whether or not to configure the UE with CPC based on the response from the T-SN;

transmitting a first message to the S-SN comprising an indication that not all the suggested/requested candidate cells were accepted.

2. The method of claim 1, wherein the indication that the subset of the one or more candidate cells were accepted by the T-SN and/or the indication identifying the new candidate cell for CPC for the UE comprises a list of cells and an associated configuration to be applied upon execution of CPC.

3. The method of claim 2, wherein the configuration comprises a radio resource control, RRC, configuration containing a secondary cell group, SCG, configuration.

4. The method of claim 3, wherein the SCG configuration comprises a Reconfiguration WithSync information element for the SCG.

5. The method of claim 1, wherein the first request comprises a secondary cell group measurement configuration, SCG MeasConfig, and an execution condition for performing CPC towards one or more of the plurality of candidate cells.

6. The method of claim 1, wherein the indication that not all the suggested/requested candidate cells were accepted comprises the subset of selected cells by the T-SN.

7. The method of claim 1, wherein the first message indicates whether the UE is configured with CPC for the subset of cells selected by the T-SN or whether the UE is not configured with CPC.

8. The method according to claim 7, wherein the first message indicates to the S-SN that the UE is not configured with CPC.

9. The method according to claim 7, further comprising:

in response to transmitting the first message to the S-SN comprising the indication that not all the suggested/requested candidate cells were accepted, receiving from the S-SN a message configuring CPC for the subset of cells that has been accepted by the T-SN, the message including measurement configurations for CPC and execution conditions for CPC mapped to the subset of selected cells.

10. The method of claim 1, further comprising:

configuring the UE for CPC with the subset of cells selected by the T-SN, wherein the first message comprises an indication that the UE was configured for CPC with the subset of cells selected by the T-SN.

11. The method according to claim 10, further comprising:

in response to configuring the UE for CPC, receiving from the UE a reconfiguration complete message; and including the reconfiguration complete message in the first message, to indicate to the S-SN that the UE is configured with CPC for the subset of cells selected by the T-SN.

12. The method according to claim 10, wherein the first message is a S-NODE CHANGE CONFIRM indicating that the UE has been configured with CPC.

13. The method of claim 1, further comprising: determining not to configure the UE for CPC based on the response from the T-SN.

14. The method of claim 13, further comprising: storing a CPC configuration of the subset of cells selected by the T-SN for later use.

15. The method of claim 1, wherein the response from the T-SN indicates that none of the identified candidate cells were accepted by the T-SN and identifying a new candidate cell for CPC for the UE, the method further comprising:

storing a target candidate configuration for the new candidate cell for CPC; and transmitting a first message to the S-SN indicating that not all the suggested/requested candidate cells were accepted and identifying the new candidate cell for CPC.

16. The method of claim 15, further comprising:

receiving a second message from the S-SN, wherein the second message includes a request for CPC for the new candidate cell for CPC; and in response to the second message, configuring the UE for CPC with the new candidate cell for CPC.

17. The method of claim 16, wherein the second message comprises a measurement configuration and execution conditions mapped to the new candidate cell for CPC.

18. The method of claim 15, further comprising:

determining that the S-SN has not provided an execution condition and/or an SCG MeasConfig for CPC for the new candidate cell for CPC within a predetermined time period; and transmitting a CPC cancel message to the T-SN for the new candidate cell for CPC in response to determining that the S-SN has not provided an execution condition and/or an SCG MeasConfig for CPC for the new candidate cell for CPC within the predetermined time period.

19. The method of claim 1, wherein the response from the T-SN indicates that a subset of the identified candidate cells were accepted by the T-SN and identifying a new candidate cell for CPC for the UE, the method further comprising:

transmitting a first message to the S-SN indicating that not all the suggested/requested candidate cells were accepted and identifying the new candidate cell for CPC; and receiving a second message from the S-SN, wherein the second message includes a request for CPC for the new candidate cell for CPC and for the subset of identified candidate cells that were accepted by the T-SN; and in response to the second message, configuring the UE for CPC with the new candidate cell for CPC and with the subset of identified candidate cells that were accepted by the T-SN.

* * * * *